United States Patent
Eastman et al.

(10) Patent No.: US 12,477,040 B2
(45) Date of Patent: Nov. 18, 2025

(54) SYSTEMS, METHODS, AND MEDIA FOR CONTROLLING SHARED EXTENDED REALITY PRESENTATIONS

(71) Applicant: Case Western Reserve University, Cleveland, OH (US)

(72) Inventors: Henry Eastman, Cleveland, OH (US); Robert Gotschall, Cleveland, OH (US); Jeffrey Mlakar, Cleveland, OH (US); Mark Griswold, Cleveland, OH (US); James Gasparatos, Cleveland, OH (US); Erin Henninger, Cleveland, OH (US)

(73) Assignee: Case Western Reserve University, Cleveland, OH (US)

( * ) Notice: Subject to any disclaimer, the term of this patent is extended or adjusted under 35 U.S.C. 154(b) by 65 days.

(21) Appl. No.: 18/709,130

(22) PCT Filed: Nov. 14, 2022

(86) PCT No.: PCT/US2022/079836
§ 371 (c)(1),
(2) Date: May 10, 2024

(87) PCT Pub. No.: WO2023/087005
PCT Pub. Date: May 19, 2023

(65) Prior Publication Data
US 2025/0007985 A1    Jan. 2, 2025

Related U.S. Application Data

(60) Provisional application No. 63/264,009, filed on Nov. 12, 2021.

(51) Int. Cl.
*G06F 15/16*    (2006.01)
*G06F 3/0486*   (2013.01)
(Continued)

(52) U.S. Cl.
CPC .......... *H04L 67/131* (2022.05); *G06F 3/0486* (2013.01); *G06T 19/006* (2013.01)

(58) Field of Classification Search
CPC .... H04L 67/131; G06F 3/0486; G06T 19/006
(Continued)

(56) References Cited

U.S. PATENT DOCUMENTS

| | | | |
|---|---|---|---|
| 7,506,264 B2 * | 3/2009 | Polan | H04L 67/02 709/208 |
| 8,150,941 B2 * | 4/2012 | Edecker | H04L 67/131 709/227 |

(Continued)

OTHER PUBLICATIONS

International Search Report in PCT/US2022/079836; received on Feb. 9, 2023.
(Continued)

*Primary Examiner* — Moustafa M Meky
(74) *Attorney, Agent, or Firm* — Quarles & Brady LLP

(57) ABSTRACT

Systems, methods, and media for controlling shared extended reality presentations are provided. In some embodiments, the system comprises: a display; and a processor programmed to: receive an indication that a computing device has joined a presentation; cause a user interface element that represents the computing device to be presented within a graphical user interface (GUI); receive, via the GUI, input indicating that the computing device is to be associated with a group of computing devices; associate the computing device with the group; cause the user interface element that represents the computing device to be presented within a portion of the GUI associated with the group of computing devices; receive, via the GUI, input to cause the group of computing devices to present particular extended reality content; and transmit an instruction to each computing device in the group of computing devices to present the particular extended reality content.

21 Claims, 10 Drawing Sheets

(51) Int. Cl.
*G06T 19/00* (2011.01)
*H04L 67/131* (2022.01)

(58) Field of Classification Search
USPC .......................................................... 709/203
See application file for complete search history.

(56) References Cited

U.S. PATENT DOCUMENTS

| | | | | |
|---|---|---|---|---|
| 8,954,527 B2* | 2/2015 | Edecker | ............. | H04L 61/4511 |
| | | | | 709/227 |
| 9,338,404 B1* | 5/2016 | Egeler | ................... | H04N 7/157 |
| 10,033,776 B2* | 7/2018 | De Napoli Ferreira | ..................... | |
| | | | | H04L 65/403 |
| 10,429,941 B2* | 10/2019 | Kamoda | ................. | G06F 3/011 |
| 10,475,050 B2* | 11/2019 | Gomez Uribe | .... | G06Q 30/0201 |
| 10,664,043 B2* | 5/2020 | Ikuta | ........................ | G06F 3/017 |
| 10,862,771 B2* | 12/2020 | Tomkins | ................. | H04L 69/22 |
| 10,887,384 B2* | 1/2021 | Osborne | ............. | H04L 12/1822 |
| 11,087,529 B2* | 8/2021 | Yeung | ..................... | G06T 15/80 |
| 11,097,186 B1 | 8/2021 | Hickman | | |
| 11,103,773 B2* | 8/2021 | Rathod | ................. | A63F 13/213 |
| 11,375,284 B2* | 6/2022 | Stokking | ............. | H04L 12/1859 |
| 11,563,785 B1* | 1/2023 | Rakshit | ................ | H04L 65/1069 |
| 11,666,825 B2* | 6/2023 | Delamont | ............. | G06T 19/006 |
| | | | | 463/32 |
| 2011/0221771 A1* | 9/2011 | Cramer | ................... | G06Q 30/02 |
| | | | | 345/633 |
| 2012/0005306 A1* | 1/2012 | Edecker | ................ | H04L 67/131 |
| | | | | 709/217 |
| 2015/0215351 A1 | 7/2015 | Barzuza et al. | | |
| 2016/0093108 A1 | 3/2016 | Mao et al. | | |
| 2019/0146653 A1* | 5/2019 | Ikuta | ......................... | G06F 3/01 |
| | | | | 715/863 |
| 2019/0304406 A1 | 10/2019 | Griswold et al. | | |
| 2019/0313160 A1* | 10/2019 | Stokking | ............. | H04N 21/6587 |
| 2019/0378335 A1 | 12/2019 | Bentovim et al. | | |
| 2020/0104522 A1 | 4/2020 | Collart | | |
| 2021/0097757 A1* | 4/2021 | Yeung | ................... | G06T 15/005 |
| 2022/0383251 A1* | 12/2022 | Moton, Jr. | ............ | H04W 4/029 |

OTHER PUBLICATIONS

European Search Report, corresponding to EP 22893921.1, dated Jul. 4, 2025.

* cited by examiner

SYSTEMS, METHODS, AND MEDIA FOR CONTROLLING SHARED EXTENDED REALITY PRESENTATIONS

CROSS-REFERENCE TO RELATED APPLICATIONS

This application is the national stage entry of PCT/US2022/079836, filed Nov. 14, 2022, which is based on, claims the benefit of, and claims priority to, U.S. Provisional Application No. 63/264,009, filed Nov. 12, 2021. The contents of these applications are incorporated by reference herein.

STATEMENT REGARDING FEDERALLY SPONSORED RESEARCH

N/A

BACKGROUND

Devices for presenting augmented reality content and/or virtual reality content have recently become more prevalent. It is relatively easy to present virtual reality content to a group of individuals that may or may not share a physical space, as the experience is completely immersive and the content can be presented in a common frame of reference into which one or more users can be inserted. For example, a virtual reality presentation can include a scene captured by one or more cameras (e.g., a nature scene, a sporting event, etc.), and multiple users accessing the content can be placed in the same location within the content, but those users may be presented with different fields of view depending on the orientation selected by the user. As another example, a virtual reality presentation can include computer generated content, and users can participate in an interactive experience in which the various users can be placed within the computer generated content at various locations, and may be able to interact with one another. In such an example, the content can have a universal frame of reference, and the content presented to a user can be based on the user's location and orientation with respect to the universal frame of reference. Although virtual reality content has the potential to allow for interaction between users within the context of the content, interaction between users in their physical space is severely limited due to the completely immersive nature of virtual reality. By contrast, while devices that present augmented reality content can allow users to interact with the physical environment and each other with relative ease, presenting the same content to multiple users is more difficult as different augmented reality devices used by users in the same room may not use the same coordinate system. Accordingly, even if different users were viewing the same augmented reality content, the content may not be presented in correspondence with the same physical space, may have a different orientation, etc. Moreover, augmented reality devices generally are not configured to coordinate to present content according to instructions from a presenter.

Accordingly, new systems, methods, and media for controlling shared extended reality presentations are desirable.

SUMMARY

In accordance with some embodiments of the disclosed subject matter, systems, methods, and media for controlling shared extended reality presentations are provided.

In accordance with some embodiments of the disclosed subject matter, a system for controlling an extended reality presentations is provided, the system comprising: a display; and at least one processor that is programmed to: receive an indication that a computing device has joined a presentation; cause a user interface element that represents the computing device to be presented within a graphical user interface; receive, via the graphical user interface, input indicating that the computing device is to be associated with a group of computing devices; associate the computing device with the group of computing devices; cause the user interface element that represents the computing device to be presented within a portion of the graphical user interface associated with the group of computing devices; receive, via the graphical user interface, input to cause the group of computing devices to present particular extended reality content; and transmit an instruction to each computing device in the group of computing devices to present the particular extended reality content.

In some embodiments, the at least one processor is further programmed to: receive, from the computing device, a message including status information; and update the user interface element that represents the computing device based on the status information.

In some embodiments, the status information includes information about a battery state of charge.

In some embodiments, the status information includes information about a location of the computing device.

In some embodiments, the computing device comprises a head mounted display.

In some embodiments, the at least one processor is further programmed to: cause a user interface element that represents a presentation setting to be presented within a graphical user interface; receive, via the graphical user interface, input indicating that the presentation setting is to be associated with at least one computing device, including the computing device; cause a second user interface element that represents the presentation setting to be presented in proximity to the user interface element that represents the computing device; and transmit an instruction to the computing device to present the particular extended reality content based on the presentation setting.

In some embodiments, the presentation setting comprises a setting enabling presentation of closed captioning information.

In some embodiments, the input indicating that the presentation setting is to be associated with the at least one computing device comprises a drag and drop input.

In accordance with some embodiments of the disclosed subject matter, a method for controlling an extended reality presentations is provided, the method comprising: receiving an indication that a computing device has joined a presentation; causing a user interface element that represents the computing device to be presented within a graphical user interface; receiving, via the graphical user interface, input indicating that the computing device is to be associated with a group of computing devices; associating the computing device with the group of computing devices; causing the user interface element that represents the computing device to be presented within a portion of the graphical user interface associated with the group of computing devices; receiving, via the graphical user interface, input to cause the group of computing devices to present particular extended reality content; and transmitting an instruction to each computing device in the group of computing devices to present the particular extended reality content.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
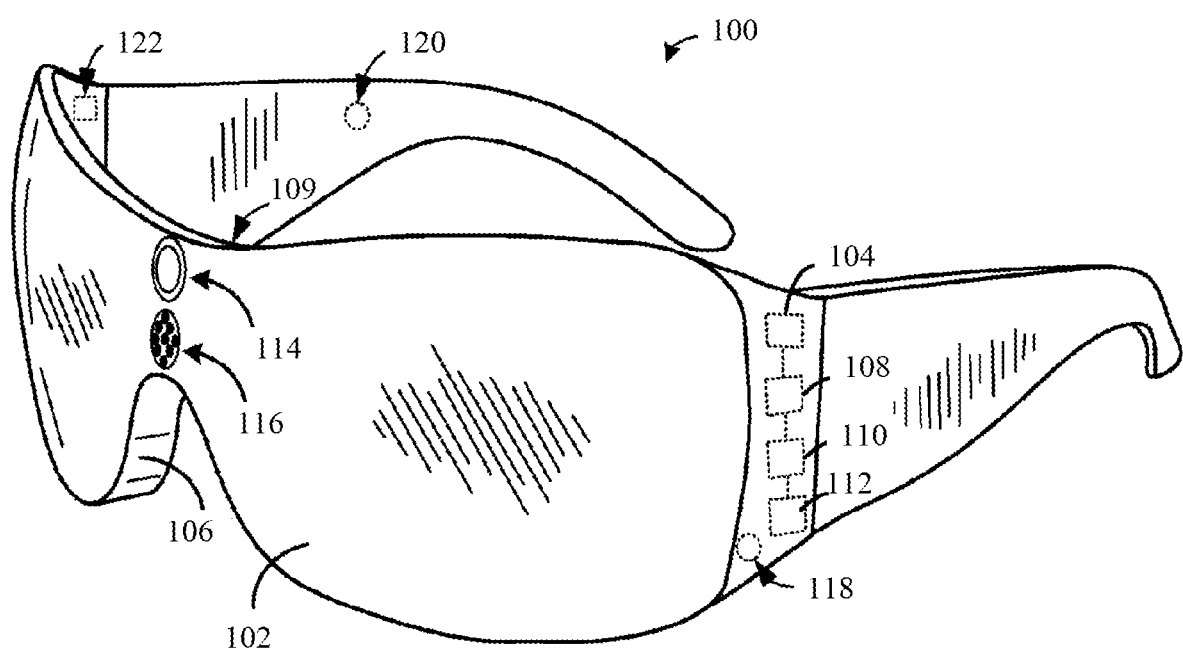
FIG. 1 shows an example of a head mounted display that can be used in accordance with some embodiments of the disclosed subject matter.

Before any embodiments of the disclosed subject matter are explained in detail, it is to be understood that the disclosed subject matter is not limited in its application to the details of construction and the arrangement of components set forth in the following description or illustrated in the following drawings. The disclosed subject matter is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the disclosed subject matter. Various modifications to the illustrated embodiments will be readily apparent to those skilled in the art, and the generic principles herein can be applied to other embodiments and applications without departing from embodiments of the disclosed subject matter. Thus, embodiments of the disclosed subject matter are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the disclosed subject matter. Skilled artisans will recognize the examples provided herein have many useful alternatives and fall within the scope of embodiments of the disclosed subject matter.

FIG. 1 shows an example 100 of a head mounted display (HMD) that can be used in accordance with some embodiments of the disclosed subject matter. As shown in FIG. 1, head mounted display 100 can include a display processor 104 and a transparent display 102 that can be used to present images, such as holographic objects, to the eyes of a wearer of HMD 100. In some embodiments, transparent display 102 can be configured to visually augment an appearance of a physical environment to a wearer viewing the physical environment through transparent display 102. For example, in some embodiments, the appearance of the physical environment can be augmented by graphical content (e.g., one or more pixels each having a respective color and brightness) that is presented via transparent display 102 to create any type of present any type of mixed reality (e.g., an augmented reality presentation, an augmented virtuality presentation) environment. Additionally or alternatively, in some embodiments, transparent display 102 can be configured to render a fully opaque virtual environment (e.g., by using one or more techniques to block the physical environment from being visible through HMD 100). In some such embodiments, HMD 100 can be used to present a virtual reality environment. In some such embodiments, the virtual reality environment can include a fully virtual environment. Alternatively, in some such embodiments, the virtual reality environment can be used to present an augmented reality presentation via pass-through virtual reality techniques. For example, one or more cameras (e.g., one or more cameras of HMD 100) can be used to capture image data representing a physical environment around a user of HMD 100, and can present image data representing the physical environment around the user of HMD 100 using a non-transparent display of HMD 100 (e.g., with virtual objects overlaid with the image data to present an augmented reality presentation). Note that the term extended reality is sometimes used herein to refer to technologies that facilitate an immersive experience, including augmented reality, mixed reality, and virtual reality.

As shown in FIG. 1, in some embodiments, transparent display 102 can include one or more image producing elements (e.g., display pixels) located within lenses 106 (such as, for example, pixels of a see-through Organic Light-Emitting Diode (OLED) display). Additionally or alternatively, in some embodiments, transparent display 102 can include a light modulator on an edge of the lenses 106, and/or a projector configured to project light onto a surface of one or more lenses 106.

In some embodiments, HMD 100 can include various sensors and/or other related systems. For example, HMD 100 can include a gaze tracking system 108 that can include one or more image sensors that can generate gaze tracking data that represents a gaze direction of a wearer's eyes. In some embodiments, gaze tracking system 108 can include any suitable number and arrangement of light sources and/or image sensors. For example, as shown in FIG. 1, the gaze tracking system 108 of HMD 100 can utilize at least one inward facing sensor 109. In some embodiments, a user can be prompted to permit the acquisition and use of gaze information to track a position and/or movement of the user's eyes.

In some embodiments, HMD 100 can include a head tracking system 110 that can utilize one or more motion sensors, such as motion sensors 112 shown in FIG. 1, to capture head pose data that can be used to track a head position of the wearer, for example, by determining the direction and/or orientation of a wearer's head. In some embodiments, head tracking system 110 can include an inertial measurement unit configured as a three-axis or three-degree of freedom position sensor system.

In some embodiments, head tracking system 110 can also support other suitable positioning techniques, such as Global Positioning System (GPS) or other global navigation systems. Further, while specific examples of position sensor systems have been described, it will be appreciated that any other suitable position sensor systems can be used. For example, head pose and/or movement data can be determined based on sensor information from any suitable combination of sensors mounted on the wearer and/or external to the wearer including but not limited to any number of gyroscopes, accelerometers, inertial measurement units (IMUs), GPS devices, barometers, magnetometers, cameras (e.g., visible light cameras, infrared light cameras, time-of-flight depth cameras, structured light depth cameras, etc.), communication devices (e.g., Wi-Fi antennas/interfaces, Bluetooth, etc.), etc.

In some embodiments, HMD 100 can include an optical sensor system that can utilize one or more outward facing sensors, such as optical sensor 114, to capture image data of the environment. In some embodiments, the captured image data can be used to detect movements captured in the image data, such as gesture-based inputs and/or any other suitable movements by a user waring HMD 100, by another person in the field of view of optical sensor 114, or by a physical object within the field of view of optical sensor 114. Additionally, in some embodiments, the one or more outward facing sensor(s) can capture 2D image information and/or depth information from the physical environment and/or physical objects within the environment. For example, the outward facing sensor(s) can include a depth camera, a visible light camera, an infrared light camera, a position tracking camera, and/or any other suitable image sensor or combination of image sensors.

In some embodiments, a structured light depth camera can be configured to project a structured illumination (e.g., using infrared light), and to generate image data of illumination reflected from a scene onto which the illumination is projected. In such embodiments, a depth map of the scene can be constructed based on spacing between features in the various regions of an imaged scene. Additionally or alternatively, in some embodiments, a time-of-flight depth camera configured to project a variable illumination (e.g., using infrared light) onto a scene and detect the illumination reflected from the scene can be incorporated in HMD 100. In some embodiments, illumination can be provided by an infrared light source 116.

In some embodiments, the HMD 100 can include a microphone system that can include one or more microphones, such as microphone 118, that can capture audio data. In other examples, audio can be presented to the wearer via one or more speakers, such as speaker 120.

In some embodiments, HMD 100 can include a controller, such as controller 122, which can include, for example, a processor and memory (as described below in connection with FIG. 4) that are in communication with the various sensors and systems of HMD 100. In some embodiments, the controller can store, in memory, instructions that are executable by the processor to receive signal inputs from the sensors, determine a pose of HMD 100, and adjust display properties for content displayed using transparent display 102.

In some embodiments, HMD 100 can have any other suitable features or combination of features, such as features described in U.S. Pat. No. 9,495,801 issued to Microsoft Technology Licensing, LLC, which is hereby incorporated by reference herein in its entirety. The description herein of HMD 100 is merely for illustration of hardware that can be used in connection with the disclosed subject matter. However, the disclosed subject matter can be used with any suitable extended reality device (e.g., the HoloLens® made by Microsoft®, and/or devices described in U.S. Pat. Nos. 8,847,988, 8,941,559, U.S. Patent Application Publication No. 2014/0160001, each of which is hereby incorporated by reference herein in its entirety), mixed reality device, and/or virtual reality device.

Figure 2:
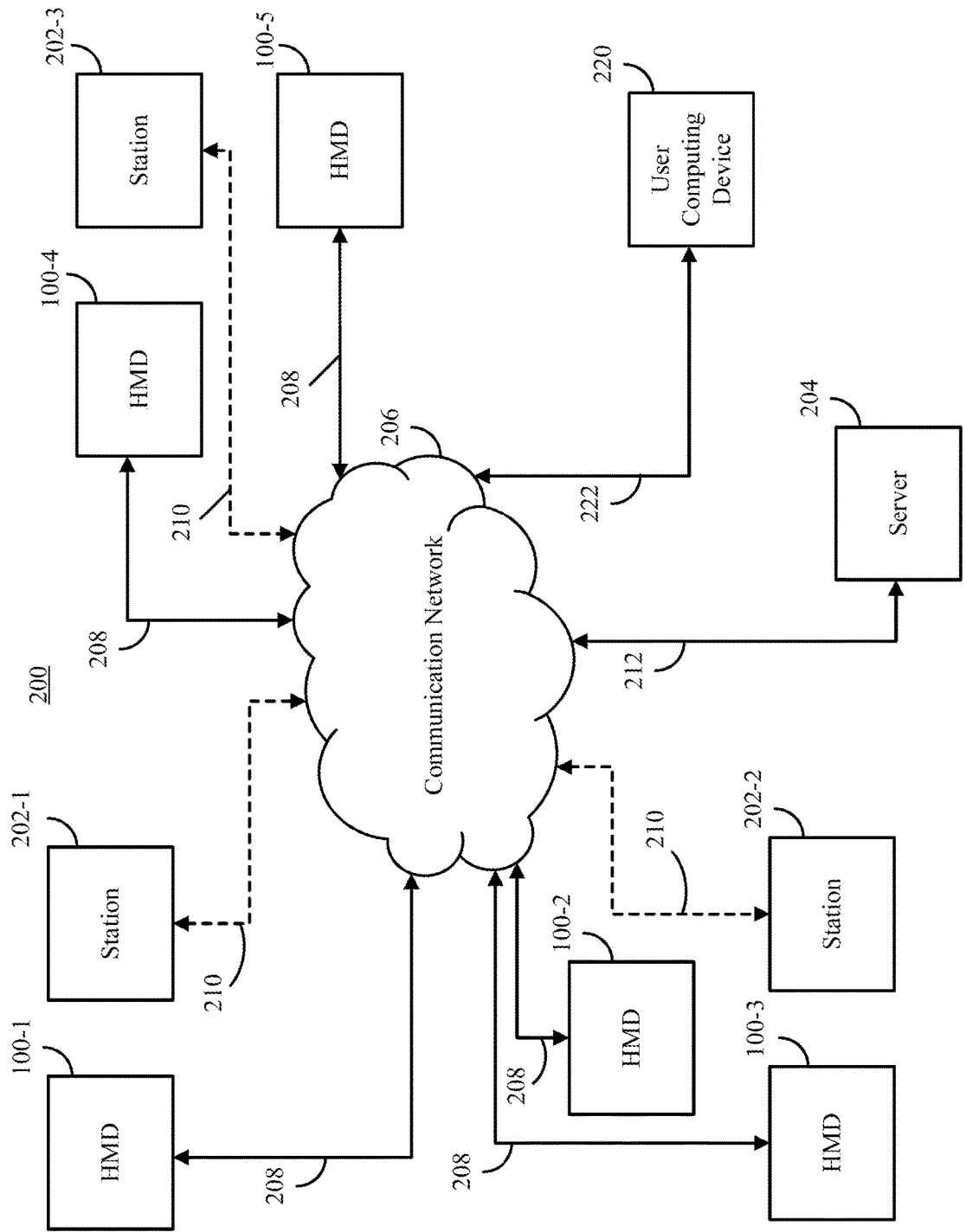
FIG. 2 shows an example of a system of networked head mounted displays in accordance with some embodiments of the disclosed subject matter.

FIG. 2 shows an example 200 of a system of networked HMDs 100 in accordance with some embodiments of the disclosed subject matter.

As shown in FIG. 2, system 200 can include various HMDs 100-1 to 100-5 located in the same physical space (e.g., in the same room). System 200 can include various stations 202-1 to 202-3, which can correspond to points in physical space at which one or more images are to be displayed by HMDs 100. For example, each station 202 can be used by HMDs 100 as a predetermined spatial anchor for one or more images or collections of digital information (e.g., including images, 3D models, etc.). In a more particular example, stations 202 can define spatial anchors for images to be displayed by an HMD (e.g., HMD 100) if the HMD is instructed to present an image corresponding to a particular station or any station that satisfies one or more criteria (e.g., based on distance, field of view, etc.), even if the HMD moves relatively far from the station (e.g., more than five meters from the station). As another example, each station 202 can be used to define a coordinate system in which HMDs 100 can place one or more images. In a more particular example, stations 202 can define the origin of a global coordinate system in which an HMD (e.g., HMD 100) is instructed to present an image only when the user is relatively close to a particular pod and/or when the HMD is instructed to only present one or more images corresponding to the nearest station in the field of view.

In some embodiments, each station 202 can be passive and/or active. For example, one or more stations 202 can be a piece of paper or other physical medium having a particular symbol (e.g., letter, number, icon, QR code, etc.) that can be recognized by HMD 100 (e.g., from an image captured by optical sensor 114). As another example, one or more stations 202 can be a particular object or portion of an object (e.g., a piece of furniture, a portion of flooring, an action figure, a toy, etc.) that can be recognized by HMD 100 (e.g., from an image captured by optical sensor 114). Such physical objects, with or without symbols, can be referred to as image targets. As yet another example, one or more stations 202 can be associated with a coordinate in reference to another object. As still another example, one or more stations 202 can be an active device such as a Bluetooth device (e.g., a Bluetooth low energy beacon) that can communicate with HMD 100. As a further example, stations 202 can be an active or passive RFID device with which HMD 100 can communicate (e.g., including unidirectional communication from the RFID device). In some embodiments, locations of stations 202 can be highlighted visually by an HMD 100 (e.g., HMDs 100-1 to 100-5) to assist users in locating the stations. For example, one or more stations 202 in a user's field of view can be represented by an image of a ball, text, an outline of the content to be presented in connection with the pod, and/or any other suitable visual aid.

In some embodiments, system 200 can include a server 204 that can control content that is to be presented in connection with one or more stations 202. In some embodiments, server 204 can be implemented using any suitable computing device such as a server computer, an HMD, a tablet computer, a smartphone, a personal computer, a laptop computer, etc. In some embodiments, each HMD 100 can connect to communication network 206 via a communications link 208, and server 204 can connect to communication network 206 via a communications link 212. In some such embodiments (e.g., embodiments in which stations 202 are active devices), stations 202 can connect to communication network 206 via a communications link 210. In some embodiments, a user computing device 220 can connect to communication network 206 via a communications link 222. Communication network 206 can be any suitable communication network or combination of communication networks. For example, communication network 206 can be a Wi-Fi network (which can include one or more wireless routers, one or more switches, etc.), a peer-to-peer network (e.g., a Bluetooth network, a Zigbee mesh network, etc.), a cellular network (e.g., a 3G network, a 4G network, etc., complying with any suitable standard, such as CDMA, GSM, LTE, LTE Advanced, WiMAX, etc.), a wired network, etc. Communications links 208, 210, 212, and 222 can each be any suitable communications link or combination of communications links, such as a Wi-Fi links, Bluetooth links, cellular links, etc.

In some embodiments, a user can interact with server 204 via user computing device 220 to select content that is to be presented in connection with one or more stations 202. For example, the user can instruct server 204 to cause HMDs in proximity to, and/or otherwise associated with, station 202-2 to present images showing one or more interactive 3D models, while the user can instruct server 204 to cause HMDs in proximity to, and/or otherwise associated with, station 202-3 to present images showing one or more interactive 3D models (e.g., including different content than what is shown in connection with station 202-2). Note that these are merely given as examples, and the user can select any suitable content to be presented in connection with each station.

In some embodiments, a user can instruct server 204 to present different content for each station, such that server 204 causes HMDs 100 to present different content for each station 202. In some such embodiments, wearers of HMDs 100 can move between stations to observe different content at each station, which the user may have selected to demonstrate different concepts and/or to present different content. Additionally or alternatively, in some embodiments, a user can instruct server 204 to present the same content at each station or a subset of stations (e.g., the same content can be presented using a first subset of stations, while different content can be presented at one or more other stations). For example, in such embodiments, multiple groups can be presented with similar content that is being displayed by all HMDs 100 in system 200 regardless of which station each HMD 100 is located near and/or associated with. In some embodiments, a user can specify the location of one or more stations 202 in relation to one or more reference points (e.g., locations in a room, reference points in relation to a particular device, etc.).

In some embodiments, user computing device 220 can be any suitable computing device or combination of devices, such as a personal computer, a laptop computer, a tablet computer, a smartphone, a wearable computer, a head mounted display (e.g., HMD 100), etc. In some embodiments, a user can select content, generate a presentation, upload content, etc., using user computing device 220 and/or server 204 using any suitable technique or combination of techniques. For example, user computing device 220 can execute a presentation application (e.g., stored in memory) that is configured to generate, edit, and/or control presentations of content for any suitable number of stations and/or any suitable number of HMDs. As another example, user computing device 220 can interact with a presentation application executed by another computing device (e.g., server 204, a cloud server, etc.) through network 206 (e.g., via a web browser executed by computing device 220 and/or another application that facilitates interaction with a remotely executed presentation application). In some embodiments, user computing device 220 can execute functions described above in connection with server 204 (e.g., using a server program executed by user computing device 220, executing a virtual machine configured to act as server 204, etc.).

In some embodiments, each HMD 100 can execute an application that can interact with server 204 (e.g., over communication network 206) to present content associated with each station. When server 204, user computing device 220, and/or a particular HMD 100 determines that a particular station is a station to be used to present content (e.g., as described below in connection with FIGS. 4 to 8C), server 204 and/or user computing device 220 can provide content associated with that station and/or instructions to present content associated with that station. Networking HMDs 100 with server 204 can facilitate HMDs 100 in presenting more content than an HMD 100 would be able to present from memory. Further, networking the HMDs 100 with server 204 can facilitate a presenter (e.g., a user of user computing device 220) in controlling the content that is being presented by the various HMDs 100 during an interactive presentation.

In some embodiments, system 200 can determine which content is to be presented by a particular HMD 100 using any suitable technique or combination of techniques. For example, HMD 100 can determine a station for which to present content, and can request content associated with that station (or stations) from server 204 and/or can present content associated with that station (or stations) from memory. In such an example, HMD 100 can use any suitable technique to determine a station 202 (or stations) at which to present content, such as by analyzing image data captured by an outward facing camera (e.g., optical sensor 114), analyzing the strength of various signals (e.g., Bluetooth signals) received from various stations 202, analyzing GPS coordinates of HMD 100 determined using a GPS receiver, etc. As another example, HMD 100 can provide information (e.g., one or more images, signal strength of various signals, GPS coordinates, etc.) to server 204, which can determine which station (or stations) to select for an HMD 100. As yet another example, server 204 can receive information from stations 202 indicating which HMDs are within a threshold distance of the station (e.g., as a distance from the station to various HMDs) based on any suitable data (e.g., signal strength of a Bluetooth signal received by the station from the various HMDs). In such an example, each station can coordinate with other nearby stations such that each HMD is indicated by only a single station. As still another example, server 204 can determine whether a predetermined period of time has elapsed since an event occurred, and server 204 can change which station an HMD 100 and/or multiple HMDs 100 (e.g., in a group) is to use to present content. In a more particular example, server 204 can receive an instruction (e.g., from user computing device 220, via an input device, etc.) to being a presentation at a particular station for an HMD 100 and/or a group of HMDs, and when a predetermined amount of time has passed, server 204 can determine that presentation at the current station is to be inhibited, and the HMD(s) 100 are to be presented with content associated with a different station (or that a presentation to the HMD(s) 100 is over and no more content is to be presented). Note that although presentation of content is generally described herein as being performed by an HMD, in some embodiments, other computing devices (e.g., handheld devices such as smartphones and tablet computers) can be used to present a mixed reality presentation, and can operate in a similar manner to an HMD 100, in a handheld configuration or worn head mounted with use of a suitable mechanism for mounting the handheld device.

In some embodiments, server 204 can provide instructions and/or content to one or more HMDs 100 at any suitable time. For example, server 204 can determine that HMD(s) 100 has left the vicinity of station 202-2 and is pointed toward and/or is near station 202-3, and can provide instructions to present the content (and/or can push the content itself) associated with station 202-3 to HMD(s) 100 in response to determining that content associated with station 202-3 is to be presented. As another example, server 204 can receive an instruction to change the content being presented in connection with any station 202 or stations (e.g., from a presenter), and/or content being presented by HMD(s) 100. In response to such an instruction, server 204 can provide an instruction to present the new content (and/or the new content itself) to appropriate HMDs 100. As yet another example, server 204 can receive instructions assigning particular HMDs 100 to receive particular content at particular times. In such an example, a wearer of a particular HMD 100 can be prompted to move to and/or look at an assigned station for which HMD 100 is presenting content after receiving an indication that the content is associated with the station from server 204 (and/or after receiving the content itself).

In some embodiments, audio information can be associated with each station, which can be presented in connection with the visual content by HMD 100. Additionally or alternatively, in some embodiments, audio can be recorded at each station (e.g., by hardware that is part of station 202 and/or by microphone 118 of one or more HMDs 100). In some embodiments, audio can be recorded at the request of the wearer of a particular HMD 100 for later access.

Although HMDs 100-1 to 100-5 are described above as being local to each other (e.g., in the same room), HMDs in system 200 can be located local to each other and/or remote from each other. For example, system 200 can be used to collaborate and/or interact with one or more wearers of HMDs 100 located in one or more remote locations. In some embodiments, two HMDs 100 can be remote from each other if there is not a line of sight between them. For example, two HMDs 100 can be considered remote from each other if they are located in different rooms, regardless of whether they are both connected to the same local area network (LAN) or to different networks. As another example, two HMDs 100 that are connected to different LANs can be considered remote from each other. As yet another example, two HMDs 100 that are connected to different subnets can be considered remote from each other. In some embodiments, two HMDs 100 that are remote from each other can be used to collaborate by representing a remote user with an avatar in connection with a hologram being presented by at least one of the two HMDs 100.

In some embodiments, server 204 and/or user computing device 220 can be located locally or remotely from HMDs 100. Additionally, in some embodiments, multiple servers 204 and/or computing devices 220 can be used (which may be located in different physical locations) to provide different content, provide redundant functions, etc. In some embodiments, one of the HMDs 100 in system 200 can perform one or more of the operations of server 204 described herein, such as instructing other HMDs when to move through the presentation, for distributing updated information, etc. For example, local HMDs 100 in system 200 can be interconnected to form a mesh network, and an HMD acting as server 204 (e.g., HMD 100-1) can control operation of the other HMDs by providing updated information. Additionally, in some embodiments, an HMD acting as server 204 can be a node in the mesh network, and can communicate over another network (e.g., a LAN, cellular, etc.) to receive other information, such as information related to a remote user. In some such embodiments, the HMD acting as server 204 can determine which HMD or HMDs to distribute information to that indicates that an avatar of a remote user is to be presented in connection with a hologram, placement information of the avatar, etc.

In some embodiments, a user of any suitable HMD (e.g., HMD 100-1) and/or user computing device 220 can control presentation of the content by providing input to the HMD and/or user computing device. For example, as described below in connection with FIGS. 4 to 8C, a user can be presented with a user interface that can be used to control presentation of content to one or more HMDs 100 and/or groups of HMDs 100. Although system 200 is generally described in connection with presenting a mixed reality presentation in a physical environment on a mixed reality device, system 200 can be configured to present any type of mixed reality (e.g., an augmented reality presentation, an augmented virtuality presentation), or a fully virtual reality presentation (e.g., which can be used to implement an augmented reality presentation using pass-through virtual reality techniques, or to implement a virtual reality presentation within a virtual environment). For example, in addition to, or in lieu, of stations 202 corresponding to locations in a physical environment, the stations can correspond to points in a virtual environment. Additionally or alternatively, in some embodiments, one or more HMDs in system 200 can be mixed reality devices, while other HMDs can be virtual reality devices. For example, a remotely located user can use a virtual reality device to join a group (e.g., at a particular station(s)). In such an example, the virtual reality device can present 3D content, avatars corresponding to other users (e.g., users of mixed reality devices located in physical proximity to the station, and/or other users of virtual reality devices) in positions relative to the 3D content representing the user's current view of the 3D content, etc. In some embodiments, a user of a virtual reality device can cause a view of the 3D content that is presented to change using any suitable technique, such as inputs received by a user input device (e.g., a game controller, a touchpad, etc.), outputs indicating physical movements of the user (e.g., rotations, translations, etc.), or any other suitable information, Additionally or alternatively, in some embodiments, a user of a virtual reality device can adopt the viewpoint of a mixed reality device that is viewing the same 3D content. In some embodiments, a virtual reality device that is used to join a group around associated with a particular station can present one or more portions of video captured at and/or near the station (e.g., by a camera that captures 360 degree video of the environment around the station) to generate a mixed reality presentation, can present the 3D content in a virtual environment (e.g., a virtual room, which may include other stations) that may or may not be similar to the physical environment of the station, or present only the 3D content and information about other users (e.g., present the 3D content in a blank environment (e.g., using a single background color)).

Figure 3:
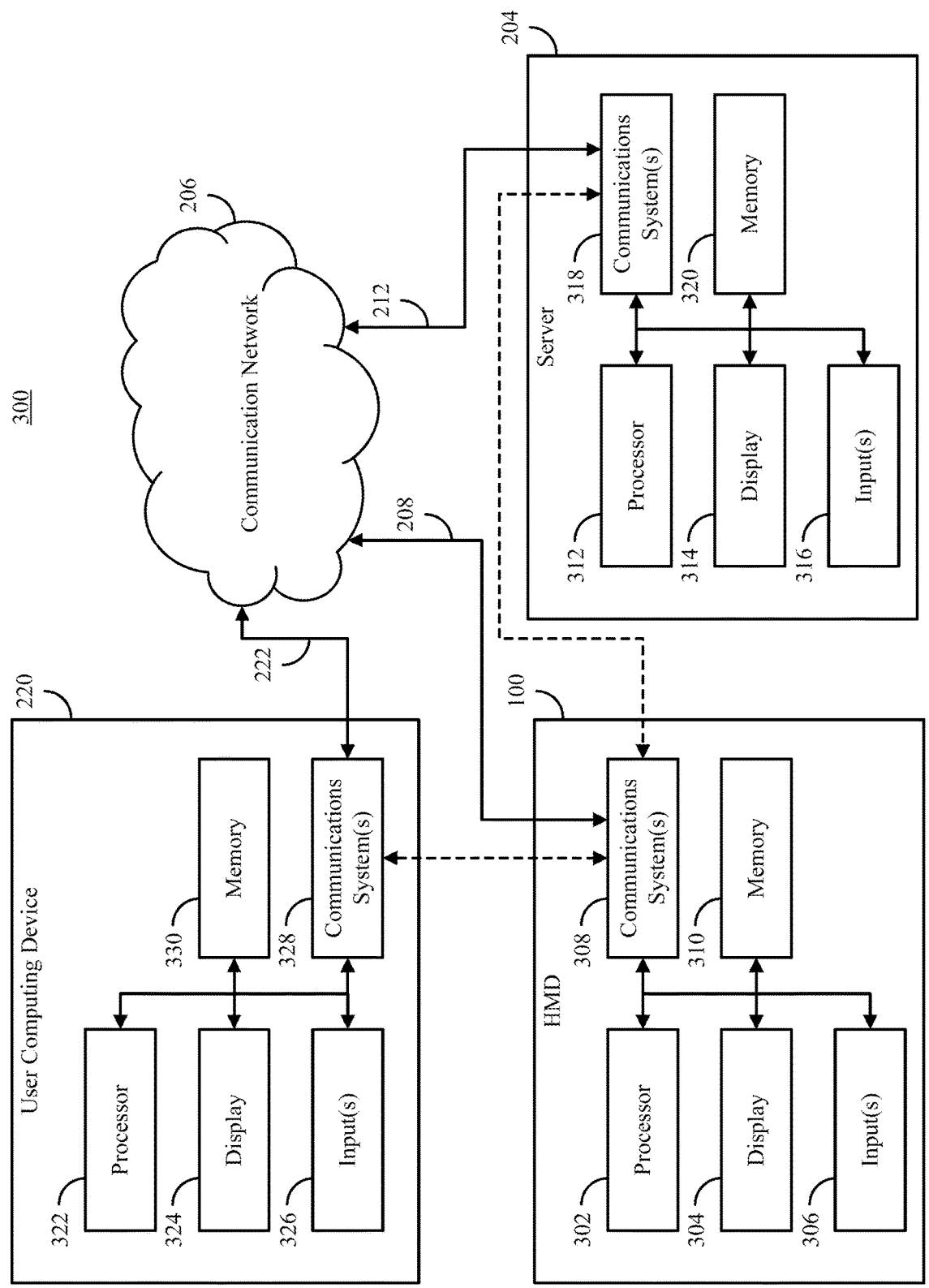
FIG. 3 shows an example of hardware that can be used to implement at least one head mounted display, at least one server, and at least one user input device in accordance with some embodiments of the disclosed subject matter.

FIG. 3 shows an example 300 of hardware that can be used to implement at least one of HMD 100, server 204, and user computing device 220 in accordance with some embodiments of the disclosed subject matter. As shown in FIG. 3, in some embodiments, HMD 100 can include a processor 302, a display 304, one or more inputs 306, one or more communication systems 308, and/or memory 310. In some embodiments, processor 302 can be any suitable hardware processor or combination of processors, such as a central processing unit (CPU), a graphics processing unit (GPU), an application specific integrated circuit (ASIC), a field programmable gate array (FPGA), etc. In some embodiments, display 304 can include any suitable display device(s), such as a transparent display as described above in connection with FIG. 1. In some embodiments, inputs 306 can include any suitable input device(s) and/or sensor(s) that can be used to receive user input, such as gaze tracking system 108, head tracking system 110, motion sensors 112, optical sensor 114, microphone 118, etc.

In some embodiments, communications systems 308 can include any suitable hardware, firmware, and/or software for communicating information over communication network 206 and/or any other suitable communication networks. For example, communications systems 308 can include one or more transceivers, one or more communication chips and/or chip sets, etc. In a more particular example, communications systems 308 can include hardware, firmware and/or software that can be used to establish a Wi-Fi connection, a Bluetooth connection, a cellular connection, etc.

In some embodiments, memory 310 can include any suitable storage device or devices that can be used to store instructions, values, etc., that can be used, for example, by processor 302 to present content using display 304, to communicate with server 204 and/or user computing device 220 via communications system(s) 308, etc. Memory 310 can include any suitable volatile memory, non-volatile memory, storage, any other suitable type of storage medium, or any suitable combination thereof. For example, memory 310 can include random access memory (RAM), read-only memory (ROM), electronically erasable programmable read-only memory (EEPROM), one or more flash drives, one or more hard disks, one or more solid state drives, one or more optical drives, etc. In some embodiments, memory 310 can have encoded thereon a computer program for controlling operation of HMD 100. In some such embodiments, processor 302 can execute at least a portion of the computer program to present content (e.g., one or more holograms), receive content and/or instructions from server 204, receive content and/or instructions from user computing device 220, transmit information to server 204, transmit information to user computing device 220, etc. In some embodiments, HMD 100 can use any suitable hardware and/or software for rendering content, such as Unity 3D available from Unity Technologies. Additionally, in some embodiments, any suitable communications protocols can be used to communicate control data, image data, audio, etc., between HMDs 100 and another device (e.g., server 204, user computing device 220, etc.), such as networking software available from Unity Technologies.

In some embodiments, server 204 can include a processor 312, a display 314, one or more inputs 316, one or more communication systems 318, and/or memory 320. In some embodiments, processor 312 can be any suitable hardware processor or combination of processors, such as a CPU, a GPU, an ASIC, an FPGA, etc. In some embodiments, display 314 can include any suitable display devices, such as a computer monitor, a touchscreen, a television, etc. In some embodiments, inputs 316 can include any suitable input devices and/or sensors that can be used to receive user input, such as a keyboard, a mouse, a touchscreen, a microphone, etc.

In some embodiments, communications systems 318 can include any suitable hardware, firmware, and/or software for communicating information over communication network 206 and/or any other suitable communication networks. For example, communications systems 318 can include one or more transceivers, one or more communication chips and/or chip sets, etc. In a more particular example, communications systems 318 can include hardware, firmware and/or software that can be used to establish a Wi-Fi connection, a Bluetooth connection, a cellular connection, etc.

In some embodiments, memory 320 can include any suitable storage device or devices that can be used to store instructions, values, etc., that can be used, for example, by processor 312 to present content using display 314, to communication with one or more HMDs 100, etc. Memory 320 can include any suitable volatile memory, non-volatile memory, storage, any other suitable type of storage medium, or any suitable combination thereof. For example, memory 320 can include RAM, ROM, EEPROM, one or more flash drives, one or more hard disks, one or more solid state drives, one or more optical drives, etc. In some embodiments, memory 320 can have encoded thereon a server program for controlling operation of server 204. In such embodiments, processor 312 can execute at least a portion of the server program to transmit content (e.g., 3D content) to one or more HMDs 100, transmit instructions to one or more devices (e.g., one or more HMDs 100), receive information and/or content from one or more HMDs 100, receive instructions from one or more devices (e.g., HMD 100 1, user computing device 220, another server, etc.).

In some embodiments, user computing device 220 can include a processor 322, a display 324, one or more inputs 326, one or more communication systems 328, and/or memory 330. In some embodiments, processor 322 can be any suitable hardware processor or combination of processors, such as a CPU, a GPU, an ASIC, an FPGA, etc. In some embodiments, display 324 can include any suitable display devices, such as a computer monitor, a touchscreen, a television, etc. In some embodiments, inputs 326 can include any suitable input devices and/or sensors that can be used to receive user input, such as a keyboard, a mouse, a touchscreen, a microphone, etc.

In some embodiments, communications systems 328 can include any suitable hardware, firmware, and/or software for communicating information over communication network 206 and/or any other suitable communication networks. For example, communications systems 328 can include one or more transceivers, one or more communication chips and/or chip sets, etc. In a more particular example, communications systems 328 can include hardware, firmware and/or software that can be used to establish a Wi-Fi connection, a Bluetooth connection, a cellular connection, etc.

In some embodiments, memory 330 can include any suitable storage device or devices that can be used to store instructions, values, etc., that can be used, for example, by processor 322 to present content using display 324, to communication with one or more HMDs 100, etc. Memory 330 can include any suitable volatile memory, non-volatile memory, storage, any other suitable type of storage medium, or any suitable combination thereof. For example, memory 330 can include RAM, ROM, EEPROM, one or more flash drives, one or more hard disks, one or more solid state drives, one or more optical drives, etc. In some embodiments, memory 330 can have encoded thereon a computer program for controlling operation of user computing device 220. In such embodiments, processor 322 can execute at least a portion of the computer program to transmit content (e.g., 3D content) to one or more HMDs 100, transmit instructions to one or more devices (e.g., server 204, one or more HMDs 100, etc.), receive information and/or content from one or more HMDs 100, receive instructions from one or more devices (e.g., an HMD 100, server 204, another computing device, etc.).

Figure 4:
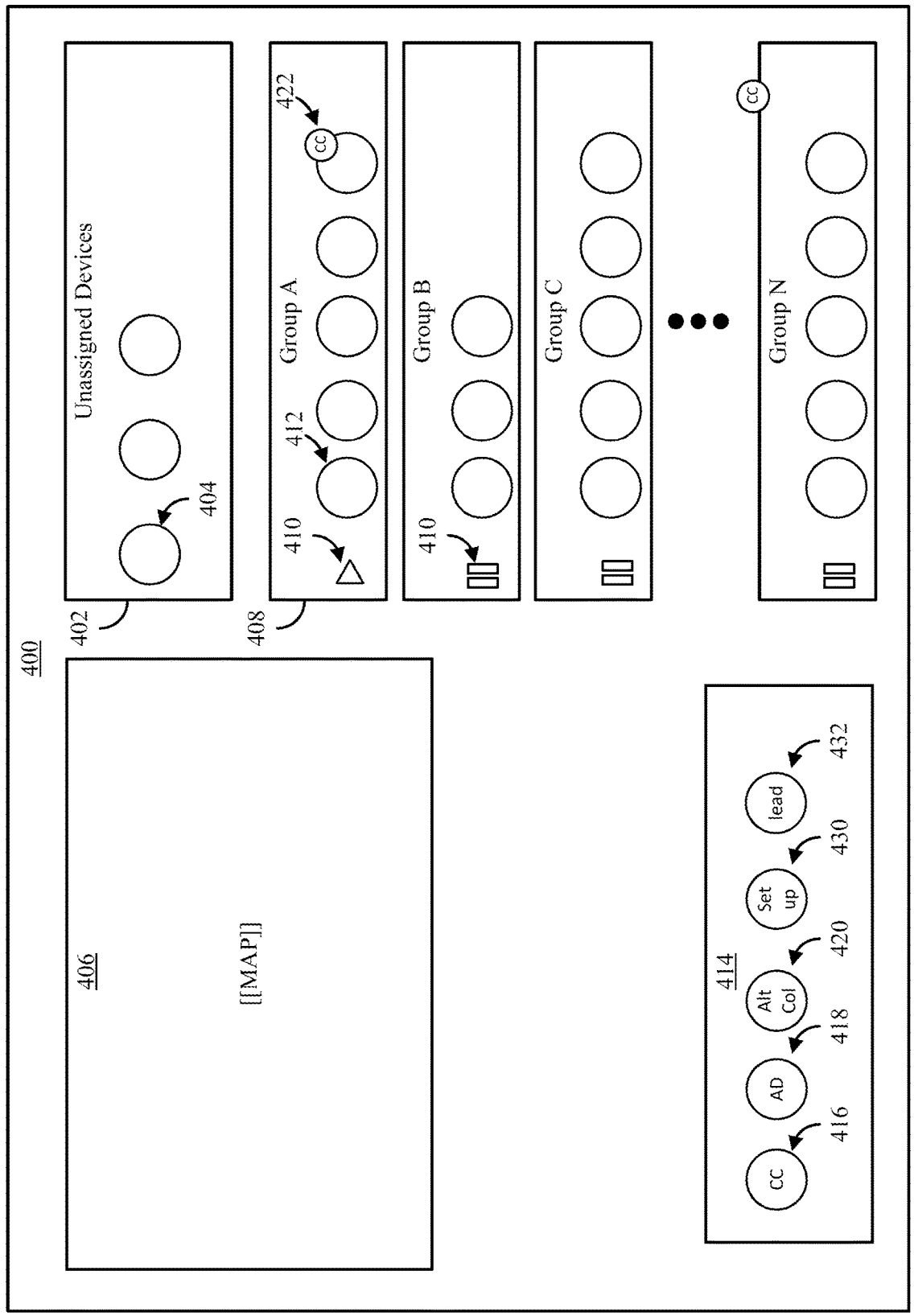
FIG. 4 shows an example of a portion of a graphical user interface that can be used to control shared extended reality presentations in accordance with some embodiments of the disclosed subject matter.

FIG. 4 shows an example 400 of a portion of a graphical user interface that can be used to control shared extended reality presentations in accordance with some embodiments of the disclosed subject matter.

As shown in FIG. 4, user interface 400 can include various user interface portions, which can be used to control presentation of content to one or more devices, which can be HMDs, and/or other computing devices. In some embodiments, user interface 400 can include a user interface portion 402 that can be used to present user interface elements associated with devices that are not associated with a group of devices. For example, when a device (e.g., an HMD) joins an experience (e.g., by logging in to an application associated with user interface 400), a user interface element (e.g., user interface element 404) can be presented within user interface portion 402, which can indicate that the device is not assigned to a group.

In some embodiments, an unassigned device (e.g., a device associated with user interface element 404) can be added to a particular group using any suitable technique or combination of techniques. For example, in some embodiments, a user interface element 404 can be dragged and dropped input a particular group. As another example, when a group becomes available (e.g., when a group finishes presenting content associated with user interface 400), one or more unassigned devices can be assigned to an empty group without user intervention (e.g., based on a queue generated as devices join the experience). In some embodiments, each user interface element associated with a device (e.g., user interface element 404) can present identifying information (e.g., an ID number, initials associated with a user, an avatar, a profile picture, etc.). In some embodiments, a particular user interface element can be selected (e.g., by hovering a cursor over the user interface element, by performing a left click operation when a cursor is over the user interface element, by performing a single press on a touchscreen, etc.), and user interface 400 can be configured to present additional information about the device associated with the user interface element and/or a current user of the device.

In some embodiments, user interface 400 can include a map portion 406, which can be used to present a representation of a location of various devices within a physical space and/or virtual space associated user interface 400. In some embodiments, positions of devices that are included in a group of devices and/or devices that are not included in any group of devices (e.g., devices associated with user interface elements currently associated with first portion 402). In some embodiments, devices can provide information that can be used to determine a location of the devices, and plot such locations within map portion 406.

In some embodiments, user interface 400 can include portions associated with groups of devices, including a group portion 408. User interface elements associated with devices (e.g., user interface element 412) can be associated with a portion of user interface 400 associated with a particular group. The presence of a user interface element associated with a particular device within a group portion can indicate that the device is associated with the group. In some embodiments, each user interface element 412 can be associated with identifying information, which can be semantically meaningful (e.g., a name of a user of the HMD associated with the user interface element 412, etc.), non-semantic (e.g., a serial number, a media access control address, a codename assigned to the HMD, etc.), and descriptive (e.g., a color or pattern used to visually mark an HMD). In some embodiments, an interaction with user interface 400 indicating a request to present additional information (e.g., metadata) associated with a particular user interface element 412 can cause information (e.g., identifying information) associated with that user interface element 412 to be presented (e.g., within a portion of user interface 400, such as via an overlay near the user interface element 412, via another portion of user interface 400, or as a new user interface that replaces user interface 400). For example, hovering a mouse cursor over a user interface element 412 can indicate a request for metadata associated with user interface element 412. As another example, selection of a particular mouse button and/or keyboard key (e.g., a left click, a right click, a click while holding control, etc.) while a cursor is over a user interface element 412 can indicate a request for metadata associated with user interface element 412. As yet another example, a tap on a portion of a touchscreen used to display a user interface element 412 can indicate a request for metadata associated with user interface element 412. As still another example, a long press on a portion of a touchscreen used to display a user interface element 412 can indicate a request for metadata associated with user interface element 412.

In some embodiments, each group portion can be associated with a selectable user interface element 410 that can be used to cause presentation of content by devices within the group to be played or paused. For example, when presentation is enabled, user interface element 410 can be presented as a "pause" symbol (e.g., as shown in connection with the "Group B" group portion in FIG. 4), and selection of user interface element 410 can cause presentation of content by the devices within the group to pause or otherwise be inhibited. As another example, when presentation is paused or otherwise disabled, user interface element 410 can be presented as a "play" symbol (e.g., as shown in connection with first group portion 408), and selection of user interface element 410 can cause presentation of content by the devices within the group to play or otherwise be enabled. In some embodiments, one or more group portions can be associated with any other selectable user interface element(s) that can be used to control presentation of content by devices within the group. For example, a group portion can be associated with a selectable user interface element (e.g., a next user interface element) that can cause presentation of content by devices within the group to move to a next portion (e.g., a next portion of content, a next scene, content associated with a next station, etc.). As another example, a group portion can be associated with a selectable user interface element (e.g., a previous user interface element) that can cause presentation of content by devices within the group to move to a previous portion (e.g., a previous portion of content, a previous scene, content associated with a previous station, etc.). As still another example, a group portion can be associated with a selectable user interface element (e.g., a restart user interface element) that can cause presentation of a current portion of content by devices within the group to restart (e.g., from a beginning of the current portion).

In some embodiments, a user interface portion 414 can include user interface elements that can be associated with features that change how content is presented by one or more devices. For example, user interface portion 414 can include a user interface element 416 (which can be referred to as a tag) that can be associated with a closed caption feature. In some embodiments, a user interface element within user interface portion 414 can be dragged to a user interface element associated with a particular device and/or a group of devices. In response to assigning a feature to one or more devices via user interface 400, a computing device presenting user interface 400 (e.g., user computing device 220, server 204) can cause the device(s) to adjust how content is presented based on the feature. For example, if closed caption user interface element 416 is associated with one or more computing devices, the computing device can cause the one or more devices to begin presenting closed captioning content in connection with content being presented by the device. In such an example, this can increase accessibility for users that have difficulty hearing and/or prefer content to be supplemented with closed caption data.

As another example, if an audio description user interface element 418 (which can be referred to as a tag) is associated with one or more computing devices, the computing device can cause the one or more devices to begin presenting audio descriptions of content that is being (or otherwise would be) presented by a display of the device. In such an example, this can increase accessibility for users that have difficulty viewing content presented by the device (e.g., an HMD) and/or prefer content to be supplemented with audio descriptions.

As another example, if an alternate color user interface element 420 (which can be referred to as a tag) is associated with one or more computing devices, the computing device can cause the one or more devices to begin presenting content using an alternate color scheme. In such an example, this can increase accessibility for users that have difficulty distinguishing certain colors (e.g., users that are colorblind) and/or prefer content to be presented in a particular color scheme.

As yet another example, if a setup user interface element 430 (which can be referred to as a tag) is associated with one or more computing devices, a server (e.g., server 204) configured to control content that is to be presented can permit the one or more devices to control one or more portions of an experience, such as the position of one or more stations and/or environmental cues, content associated with a particular station, etc.

As still another example, if a leader user interface element 432 (which can be referred to as a tag) is associated with one or more computing devices, a server (e.g., server 204) configured to control content that is to be presented can designate the one or more devices as a lead device. In such an example, an HMD with which leader user interface element 432 can be permitted to access and/or use a menu(s) that control an extended reality experience for multiple devices (e.g., all devices in the same group as the HMD associated with leader user interface element), while limiting visibility of such a menu(s) to only the HMD associated with the leader tag. In a particular example, such a leader tag can be used to facilitate a teacher controlling presentation to a class, to facilitate a museum docent controlling presentation to facilitate a tour, etc. Additionally, in some embodiments, a menu that can be accesses by an HMD associated with a leader tag can be used to load new data into the experience, to move a visualization into a new state, etc.

In some embodiments, a user interface element associated with a device that has been configured to present extended content based on one or more features available within user interface portion 414 can be associated with an auxiliary user interface element (e.g., user interface element 422).

In some embodiments, devices that have joined the experience associated with user interface 400 can periodically communicate status information (e.g., at regular and/or irregular intervals), which can be used to alter how user interface elements are presented. For example, if a device does not provide a communication for at least a predetermined period of time (e.g., a particular amount of time, a particular number of missed communications, etc.), user interface 400 can be updated to indicate that the device has become disconnected or otherwise non-communicative. In a more particular example, a background and/or foreground of the user interface element can be changed to indicate that the device has become disconnected. Additionally or alternatively, in some embodiments, a user interface element indicating a disconnection can be presented as an auxiliary user interface element associated with the device becoming disconnected (e.g., presented similarly to auxiliary user interface element 422, and showing an indicator that a battery level is low).

As another example, each device can report a battery level periodically, and user interface 400 can be updated to present information indicative of a current battery level. In a more particular example, a background of the user interface element can be filled based on a current battery level and/or a color of the background can reflect a current battery level (e.g., when a battery level is above a threshold the background can be shown in green, and when the battery level is below the threshold the background can be shown in red). Additionally or alternatively, in some embodiments, a user interface element indicating a low battery level (e.g., a battery level below a threshold) can be presented as an auxiliary user interface element associated with the device having a low battery level (e.g., presented similarly to auxiliary user interface element 422, and showing an indicator that a battery level is low).

Figure 5A:
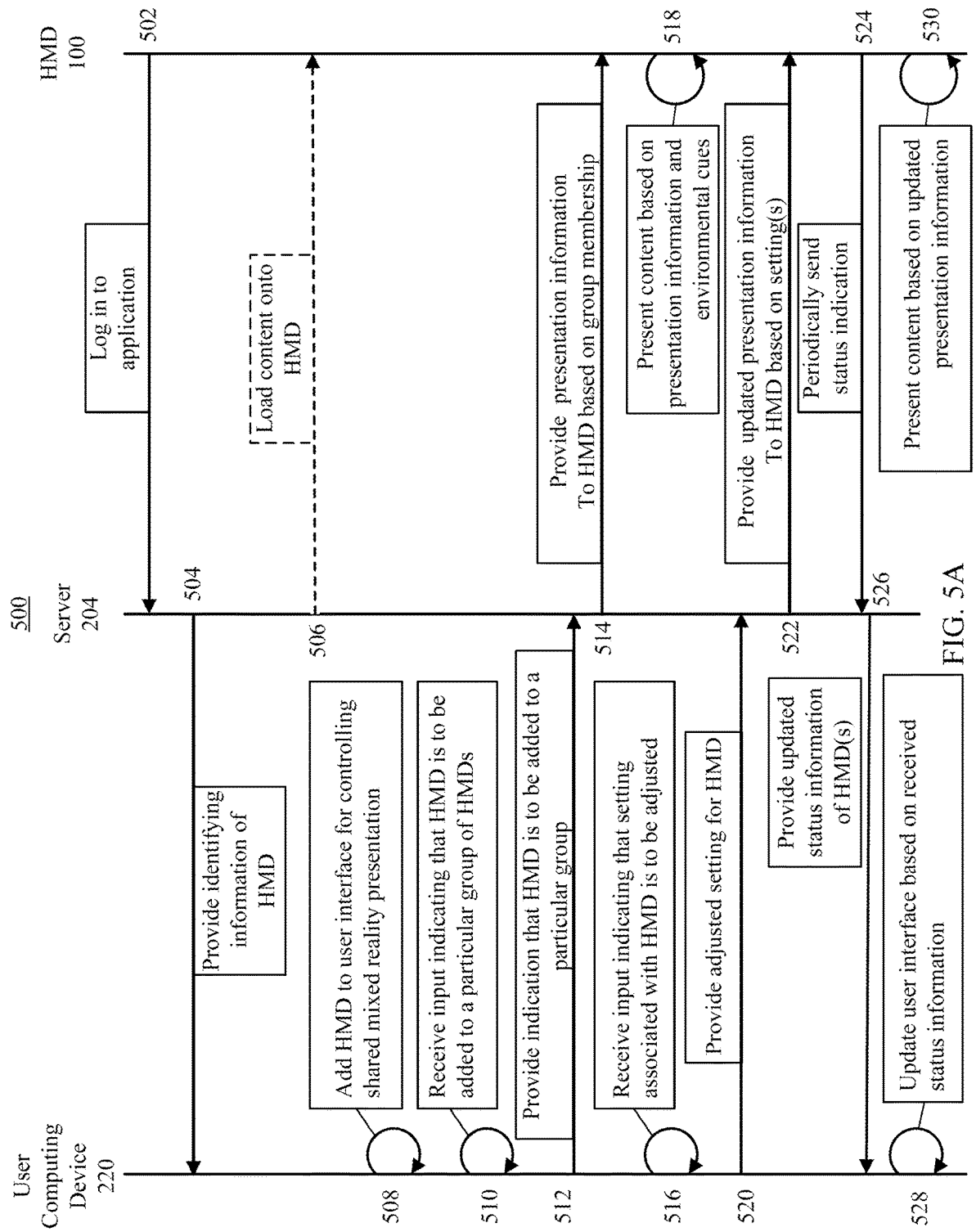
FIG. 5A shows an example of an information flow among a user computing device, a server, and a head mounted display to control a shared extended reality presentation in accordance with the presentation in accordance with some embodiments of the disclosed subject matter.

FIG. 5A shows an example 500 of an information flow among a user computing device, a server, and a head mounted display to control a shared extended reality presentation in accordance with the presentation in accordance with some embodiments of the disclosed subject matter.

As shown in FIG. 5A, at 502 an HMD (e.g., HMD 100) can log in to an application associated with a particular experience using any suitable technique or combination of techniques. For example, HMD 100 can launch the application in response to input provided to HMD 100 (e.g., user input, detection of a particular QR code in an image captured by optical sensor 114, etc.). As another example, HMD 100 can provide credentials (e.g., a username and password, a token, etc.) that can be used to determine whether a user of HMD 100 is authorized to access the application. In some embodiments, HMD 100 can log in to the application by transmitting information (e.g., credentials, a message indicating launch of the application, etc.) to a server (e.g., server 204).

At 504, server 204 can provide identifying information associated with the HMD that logged in to the application to a user computing device (e.g., user computing device 220) executing an application configured to control a mixed reality presentation (e.g., a mixed reality experience) via a user interface (e.g., user interface 400).

At 506, server 204 can load content associated with the application onto HMD 100 using any suitable technique or combination of techniques. In some embodiments, server 204 can provide a corpus of content to one or more HMDs (e.g., including HMD 100) that are to present at least a portion of the content during a presentation. For example, server 204 can provide at least a portion of the corpus as part of an application that is downloaded to an HMD. As another example, server 204 can provide at least a portion of the corpus in response to a request from an HMD. As yet another example, server 204 can provide content on demand and/or can stream content to HMDs as it is needed. In a more particular example, before a presentation begins, server 204 can provide content used in that presentation to HMDs. In some embodiments, 506 can be omitted. For example, if HMD 100 already has the content associated with a presentation, 506 can be omitted.

At 508, user computing device 220 can add the HMD that logged in at 502 to a user interface for controlling a shared extended reality presentation. For example, as described above in connection with FIG. 4, computing device 220 can add a user interface element corresponding to HMD 100 to a portion of the user interface associated with unassigned devices.

At 510, user computing device 220 can receive input indicating that HMD 100 is to be added to a particular group. In some embodiments, user computing device 220 can receive any suitable input from any suitable device that indicates that HMD 100 is to be added to a particular group. For example, user computing device 220 can receive input (e.g., via a mouse, via a touchscreen, etc.) corresponding to a drag and drop of the user interface element associated with HMD 100. As another example, user computing device 220 can receive input indicating that a menu associated with HMD 100 is to be presented (e.g., via a right click input on a mouse, via a long press on a touchscreen, etc.), and can receive a selection of a group to which HMD 100 is to be added via the menu.

At 512, user computing device 220 can provide an indication that HMD 100 is to be added to a particular group to server 204 using any suitable technique or combination of techniques. For example, user computing device 220 can transmit a message to server 204 indicating to which group HMD 100 has been assigned.

At 514, server 204 can provide presentation information to HMD 100 based on the group with which HMD 100 is associated. For example, server 204 can provide instructions indicting which content is to be presented, and/or which location(s) (e.g., a station 202) that is to be used as an anchor(s) for content that is to be presented. As another example, server 204 can provide instructions that cause presentation of content to be initiated and/or inhibited (e.g., based on an indication received from user computing device 220 in response to a play/pause user interface element has been selected).

At 516, user computing device 220 can receive input indicating that a setting associated with HMD 100 and/or other devices (e.g., other HMDs) is to be adjusted. For example, computing device 220 can receive an indication that HMD 100 and/or a group associated with HMD 100 is to present closed caption information in connection with content being presented by HMD 100 (e.g., user interface element 416 can be dragged to a user interface element associated with HMD 100, a "right click" menu can be used to indicate that HMD 100 is to present closed caption information, etc.). As another example, computing device 220 can receive an indication that HMD 100 and/or a group associated with HMD 100 is to no longer present closed caption information (e.g., user interface element 422 can be dragged away from a user interface element associated with HMD 100). As yet another example, computing device 220 can receive an indication that a group associated with HMD 100 is to present particular content and/or being presenting a particular portion of content (e.g., corresponding to a particular time in a presentation). In a more particular example, a "right click" menu can be used to indicate content to be presented to the group, a time within the presentation to which the group is to navigate, etc. In another more particular example, an order of groups can be adjusted by dragging a user interface element(s) associated with a group(s).

At 518, HMD 100 can present content based on presentation information received from server 204 and/or based on environmental cues (e.g., a location of HMD 100, the location of one or more stations, etc.) using any suitable technique or combination of techniques. For example, HMD 100 can present content in connection with a particular environmental cue that is in a field of view of a user. As another example, HMD 100 can present content in connection with a particular environmental cue that is closest to the HMD in the environment. As yet another example, HMD 100 can present content in connection with one or more environmental cues based on presentation information indicating that content that is being displayed is to change.

At 520, user computing device 220 can provide an indication to server 204 of one or more settings that have been adjusted for HMD 100 and/or other devices (e.g., other HMDs).

At 522, server 204 can provide updated presentation information to HMD 100 based on a setting(s) that have been adjusted. For example, server 204 can provide presentation information that causes HMD 100 to present closed caption information in response to receiving an indication that a closed caption setting associated with HMD 100 has been updated (e.g., to enable presentation of closed captioning information).

At 524, HMD 100 can provide a status indication to server 204. In some embodiments, the status indication provided by HMD 100 can include any suitable content. For example, HMD 100 can include information indicative of a current state of charge of a battery of HMD 100. As another example, HMD 100 can include information indicative of a current location and/or orientation of HMD 100 (which can be represented as transform information). As described above in connection with FIG. 4, HMD 100 can communicate a status indication and/or any suitable information periodically (e.g., at regular and/or irregular intervals) to server 204, which can be referred to as a heartbeat signal.

At 526, server 204 can provide status information about one or more HMDs that have logged into the application (e.g., including HMD 100) to user computing device 220 at any suitable time(s) (e.g., periodically at regular and/or irregular intervals).

At 528, user computing device 220 can update a user interface based on status information received from server 204. For example, user computing device 220 can use status information provided at 526 to update a color of a user interface element to indicate that a battery of HMD 100 is below a threshold state of charge. As another example, user computing device 220 can update a location of HMD 100 on a map portion of a user interface.

At 530, HMD 100 can present content based on updated presentation information provided by server 204 at 522. For example, HMD 100 can present closed captioning information in connection with other content being presented by HMD 100 based on an instruction from server 204 to begin presenting closed captioning information. In some embodiments, such closed captioning information (or other information or content) can be received with the other content that is to be presented (e.g., content loaded at 506). Additionally or alternatively, in some embodiments, closed captioning information (or other information or content) can be provided in connection with updated presentation information (e.g., the updated presentation information provided at 522).

Figure 5B:
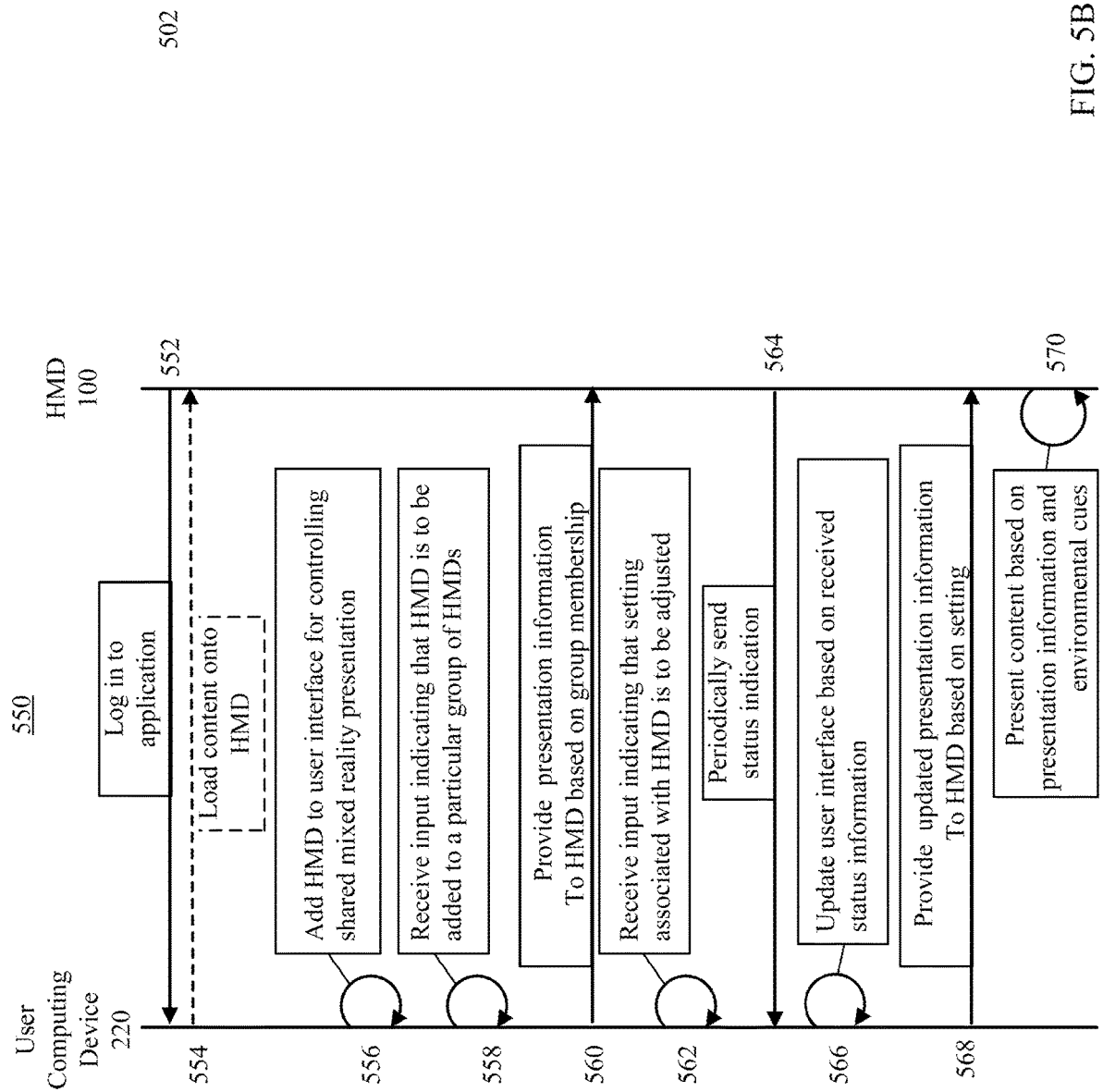
FIG. 5B shows an example of an information flow among a user computing device, and a head mounted display to control a shared extended reality presentation in accordance with the presentation in accordance with some embodiments of the disclosed subject matter.

FIG. 5B shows an example 550 of an information flow among a user computing device, and a head mounted display to control a shared extended reality presentation in accordance with the presentation in accordance with some embodiments of the disclosed subject matter.

As shown in FIG. 5B, at 552 an HMD (e.g., HMD 100) can log in to an application associated with a particular experience using any suitable technique or combination of techniques. For example, HMD 100 can launch the application in response to input provided to HMD 100 (e.g., user input, detection of a particular QR code in an image captured by optical sensor 114, etc.). As another example, HMD 100 can provide credentials (e.g., a username and password, a token, etc.) that can be used to determine whether a user of HMD 100 is authorized to access the application. In some embodiments, HMD 100 can log in to the application by transmitting information (e.g., credentials, a message indicating launch of the application, etc.) to a server (e.g., user computing device 220 acting as a server for the application).

At 554, user computing device 220 can load content associated with the application onto HMD 100 using any suitable technique or combination of techniques. In some embodiments, user computing device 220 can provide a corpus of content to one or more HMDs (e.g., including HMD 100) that are to present at least a portion of the content during a presentation. For example, user computing device 220 can provide at least a portion of the corpus as part of an application that is downloaded to an HMD. As another example, user computing device 220 can provide at least a portion of the corpus in response to a request from an HMD. As yet another example, user computing device 220 can provide content on demand and/or can stream content to HMDs as it is needed. In a more particular example, before a presentation begins, user computing device 220 can provide content used in that presentation to HMDs. In some embodiments, 554 can be omitted. For example, if HMD 100 already has the content associated with a presentation, 554 can be omitted.

At 556, user computing device 220 can add the HMD that logged in at 552 to a user interface for controlling a shared extended reality presentation. For example, as described above in connection with FIG. 4, computing device 220 can add a user interface element corresponding to HMD 100 to a portion of the user interface associated with unassigned devices.

At 558, user computing device 220 can receive input indicating that HMD 100 is to be added to a particular group. In some embodiments, user computing device 220 can receive any suitable input from any suitable device that indicates that HMD 100 is to be added to a particular group. For example, user computing device 220 can receive input (e.g., via a mouse, via a touchscreen, etc.) corresponding to a drag and drop of the user interface element associated with HMD 100. As another example, user computing device 220 can receive input indicating that a menu associated with HMD 100 is to be presented (e.g., via a right click input on a mouse, via a long press on a touchscreen, etc.), and can receive a selection of a group to which HMD 100 is to be added via the menu.

At 560, user computing device 220 can provide presentation information to HMD 100 based on the group with which HMD 100 is associated. For example, user computing device 220 can provide instructions indicting which content is to be presented, and/or which location(s) (e.g., a station 202) is to be used as an anchor(s) for content that is to be presented. As another example, user computing device 220 can provide instructions that cause presentation of content to be initiated and/or inhibited (e.g., based on an indication received from user computing device 220 in response to a play/pause user interface element has been selected).

At 562, user computing device 220 can receive input indicating that a setting associated with HMD 100 and/or other devices (e.g., other HMDs) is to be adjusted. For example, computing device 220 can receive an indication that HMD 100 and/or a group associated with HMD 100 is to present closed caption information in connection with content being presented by HMD 100 (e.g., user interface element 416 can be dragged to a user interface element associated with HMD 100, a "right click" menu can be used to indicate that HMD 100 is to present closed caption information, etc.). As another example, computing device 220 can receive an indication that HMD 100 and/or a group associated with HMD 100 is to no longer present closed caption information (e.g., user interface element 422 can be dragged away from a user interface element associated with HMD 100).

At 564, HMD 100 can provide a status indication to user computing device 220. In some embodiments, the status indication provided by HMD 100 can include any suitable content. For example, HMD 100 can include information indicative of a current state of charge of a battery of HMD 100. As another example, HMD 100 can include information indicative of a current location and/or orientation of HMD 100. As described above in connection with FIG. 4, HMD 100 can communicate a status indication and/or any suitable information periodically (e.g., at regular and/or irregular intervals) to user computing device 220, which can be referred to as a heartbeat signal.

At 566, user computing device 220 can update a user interface based on status information received from HMD 100 and/or other devices (e.g., one or more other HMDs). For example, user computing device 220 can use status information provided at 564 to update a color of a user interface element to indicate that a battery of HMD 100 is below a threshold state of charge. As another example, user computing device 220 can update a location of HMD 100 on a map portion of a user interface.

At 568, user computing device 220 can provide updated presentation information to HMD 100 based on a setting(s) that have been adjusted. For example, user computing device 220 can provide presentation information that causes HMD 100 to present closed caption information in response to receiving an indication that a closed caption setting associated with HMD 100 has been updated (e.g., to enable presentation of closed captioning information).

At 570, HMD 100 can present content based on presentation information provided at 560 and/or updated presentation information provided at 568. For example, HMD 100 can present closed captioning information in connection with other content being presented by HMD 100 based on an instruction from user computing device 220 to begin presenting closed captioning information. In some embodiments, such closed captioning information (or other information or content) can be received with the other content that is to be presented (e.g., content loaded at 554). Additionally or alternatively, in some embodiments, closed captioning information (or other information or content) can be provided in connection with updated presentation information (e.g., the updated presentation information provided at 568).

Figure 5C:
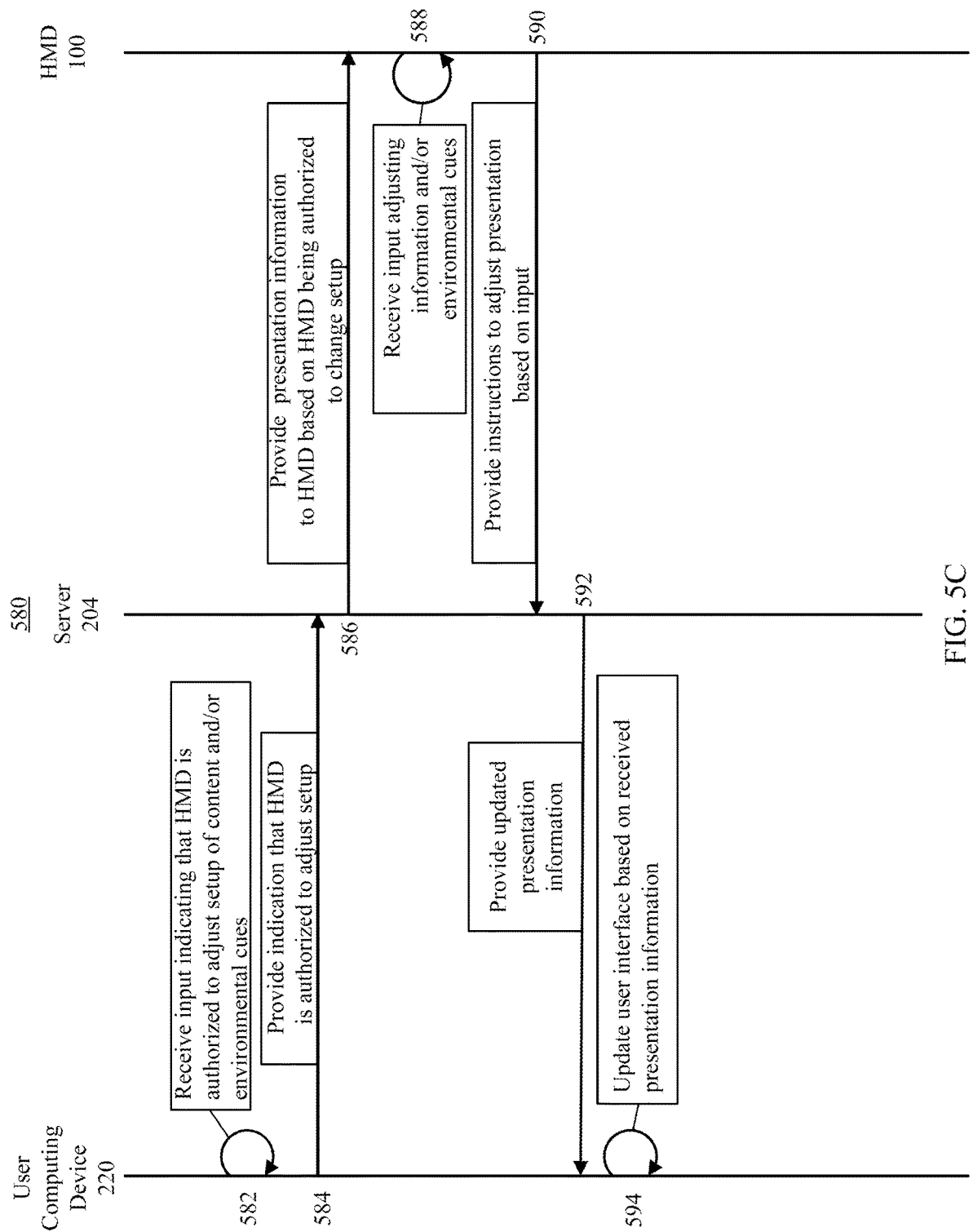
FIG. 5C shows an example of an information flow among a user computing device, a server, and a head mounted display to adjust a shared extended reality presentation in accordance with the presentation in accordance with some embodiments of the disclosed subject matter.

FIG. 5C shows an example 580 of an information flow among a user computing device, a server, and a head mounted display to adjust a shared extended reality presentation in accordance with the presentation in accordance with some embodiments of the disclosed subject matter.

In some embodiments, a hear mounted display (e.g., HMD 100) shown in FIG. 5C can be an HMD that has been added to a user interface for controlling a shared mixed reality presentation (e.g., as described above in connection with 508 of FIG. 5).

At 582, user computing device 220 can receive input indicating that HMD 100 is to be authorized to adjust a setup of content and/or environmental cues associated with a mixed reality presentation. In some embodiments, user computing device 220 can receive any suitable input from any suitable device that indicates that HMD 100 is to be authorized to adjust a setup of content and/or environmental cues. For example, user computing device 220 can receive input (e.g., via a mouse, via a touchscreen, etc.) corresponding to a drag and drop of a setup user interface element (e.g., setup user interface element 430) with a user interface element associated with HMD 100 (e.g., a user interface element 412). As another example, user computing device 220 can receive input indicating that a menu associated with HMD 100 is to be presented (e.g., via a right click input on a mouse, via a long press on a touchscreen, etc.), and can receive a selection indicating that HMD 100 is to be authorized to adjust a setup of content and/or environmental cues.

At 584, user computing device 220 can provide an indication that HMD 100 is authorized to adjust a setup of content and/or environmental cues associated with a mixed reality presentation. For example, user computing device 220 can transmit a message to server 204 indicating that HMD 100 is authorized to adjust a setup of content and/or environmental cues associated with a mixed reality presentation. In a more particular example, such a message can include identifying information of the HMD (e.g., a MAC address, an IP address, etc.), identifying information of a user that is authorized to adjust a setup (e.g., a user that has logged in via the HMD and/or in connection with the HMD), and/or identifying information of the mixed reality presentation.

At 586, server 204 can provide presentation information to HMD 100 based on the authorization to change the setup. For example, server 204 can provide instructions indicting which content is included in the presentation, be presented, and/or which location(s) (e.g., a station 202) is to be used as an anchor(s) for content that is to be presented. As another example, server 204 can provide instructions indicating an order in which the content is to be presented at a particular physical location(s).

At 588, HMD 100 can facilitate adjustments to the information included in the presentation and/or environmental cues used in presenting the information, which can include receiving input adjusting the information to be presented and/or environmental cues to use for presentation. For example, HMD 100 can present content based on presentation information received from server 204 and/or based on environmental cues (e.g., a location of HMD 100, the location of one or more stations, etc.), and can receive input to make adjustments to the presentation. In a more particular example, the input can be an indication to change which information is to be included in the presentation (e.g., to add content, delete content, change an order or presentation, change which content is to be anchored at which point in the environment, etc.). As another more particular example, the input can be an indication to change which environmental cues (e.g., stations) are to be used to determine which content to present (e.g., to add a station, to remove a station, to move the location of a station, etc.)

At 590, HMD 100 can provide instructions to server 204 to adjust one or more aspects of the mixed reality presentation based on the input received at 588. For example, in response to HMD 100 receiving input to adjust an aspect of the presentation, HMD 100 can provide an instruction to server 204 reflecting a change to the presentation indicated by the input. As another example, in response to HMD 100 receiving input to adjust an aspect of the presentation, HMD 100 can record a change indicated by the input, and when an indication that changes are complete is received by HMD 100 (e.g., a save user interface element is selected), HMD 100 can provide instructions to server 204 reflecting all changes to the presentation indicated by the inputs received by HMD 100.

At 592, server 204 can provide update presentation information to user computing device 220. For example, server 204 can provide update presentation information that can be used to populate a map presented as a portion of a user interface (e.g., user interface 400), used to update one or more menus used to select a portion of a presentation to be presented to a group of HMDs, etc.

At 594, user computing device 220 can update a user interface to reflect updates to the presentation information received at 592.

Figure 6:
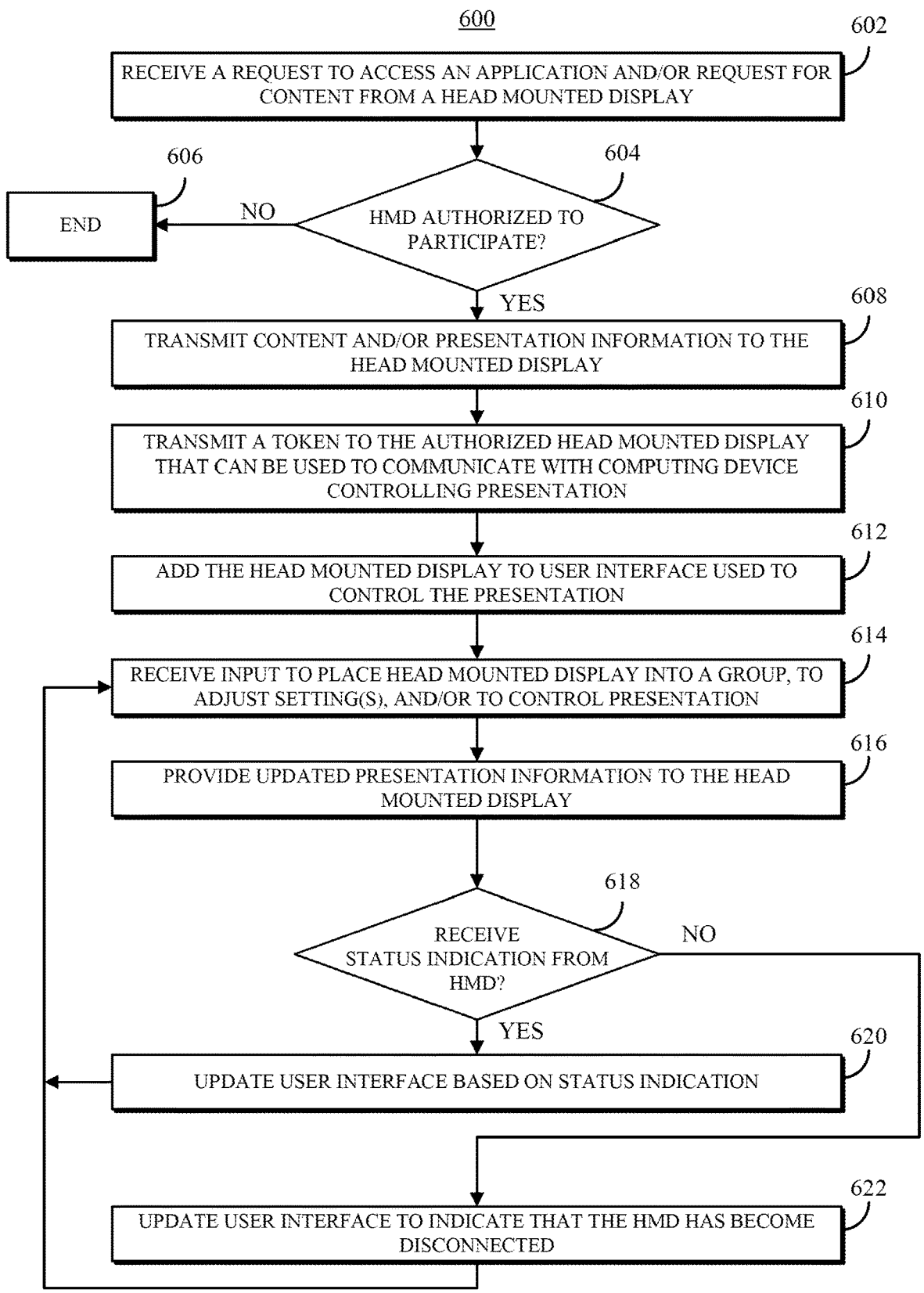
FIG. 6 shows an example of a process for controlling a shared extended reality presentation in accordance with some embodiments of the disclosed subject matter.

FIG. 6 shows an example of a process for controlling a shared extended reality presentation in accordance with some embodiments of the disclosed subject matter.

As shown in FIG. 6, at 602 process 600 can receive a request to access an application and/or a request for content from a head mounted display (e.g., via an application executed by the HMD) or other appropriate device, such as a handheld device (e.g., a smartphone, a tablet, etc.). In some embodiments, the HMD can launch (or otherwise access) the application in response to input provided to the HMD (e.g., user input, detection of a particular QR code in an image captured by optical sensor 114, etc.), and the application can cause the HMD to request access to the application and/or content associated with the application. Additionally or alternatively, in some embodiments, the HMD can launch the application in response to input provided to the HMD, and the application can cause the HMD to prompt a user to log in to the application and/or otherwise provide credential information that can be used to verify whether the user is authorized to access the application and/or content. In some embodiments, the HMD can provide information that is received at 602, such as credentials associated with a user, with the application, and/or with the device executing the application.

At 604, process 600 can determine whether the HMD (or other device) is authorized to access the application and/or content. In some embodiments, process 600 can use any suitable technique or combination of techniques to determined whether the HMD is authorized to access the application and/or content. For example, process 600 can determine whether the HMD is logged in to a user account that has been authorized to access the application, to participate in the presentation, and/or to receive the content associated with the application and/or presentation.

If process 600 determines that the HMD or other device is not authorized to access the application and/or content ("NO" at 606), process 600 can move to 606, and at 606 process 600 end and/or prompt the HMD to provide credentials associated with an authorized account. Otherwise, if process 600 determines that the HMD or other device is not authorized to access the application and/or content ("NO" at 606), process 600 can move to 608.

At 608, process 600 can transmit content and/or presentation information to the HMD. In some embodiments, the content and/or presentation information can be transmitted using any suitable protocol(s), in any suitable format, and/or with any suitable compression applied (e.g., as described above).

At 610, process 600 can transmit a token to the authorized HMD that can be used to communicate with a computing device controlling the presentation (e.g., a computing device executing process 600). In some embodiments, the token can take any suitable form. For example, the token can be formatted in accordance with a standard, such as Open Authorization (OAuth), OpenID, JSON Web Token (JWT), etc. Additionally, in some embodiments, the token can be configured to expire after a predetermined amount of time. In some embodiments, another type of authentication can be used, in addition to or in lieu of a token-based authentication. For example, communications from a particular HMD can be encrypted using a private key associated with that HMD (e.g., provided by server 204, provided by an administrator of HMD 100, provided by a manufacturer of HMD 100, etc.). In such an example, a server receiving communication from HMD 100 can use a public key associated with that HMD to decrypt communications, and successful decryption can act as a validation of the identity of the HMD. In such an example, process 600 cam omit transmitting an authentication token at 610. In a particular example, process 600 can indicate that a particular public key is associated with an authorized device (e.g., in a database), and process 600 can validate the identity of the transmitter as the HMD 100 that is authorized based on a successful decryption of at least a portion of a message (e.g., included in a header).

At 612, process 600 can add a user interface element representing the HMD to a user interface that can be used to control various aspects of the presentation. For example, as described above in connection with FIGS. 4, 5A, and/or 5B (e.g., in connection with 508 and 556), process 600 can add a user interface element representing the HMD to a user interface for controlling a shared extended reality presentation. For example, as described above in connection with FIG. 4, computing device 220 can add a user interface element corresponding to HMD 100 to a portion of the user interface associated with unassigned devices.

At 614, process 600 can receive input to place the HMD into a group, to adjust one or more settings, and/or to control one or more aspects of the presentation to one or more HMDs. For example, as described above in connection with FIGS. 4, 5A, and/or 5B (e.g., in connection with 510 and 558), process 600 can receive input (e.g., via the user interface) indicating that an HMD(s) is to be added to a particular group. As another example, as described above in connection with FIGS. 4, 5A, and/or 5B (e.g., in connection with 516 and 562), process 600 can receive input (e.g., via the user interface) indicating that a setting associated with an HMD(s) is to be adjusted.

At 616, process 600 can provide updated presentation information to one or more HMDs based on input received at 614. For example, process 600 can provide an indication of which content to present, a location(s) at which to present the content, whether to present supplemental content (e.g., closed caption information, audio descriptions of what is being presented, etc.).

At 618, process 600 can determine whether a status indication has been received from each HMD that has been participating in the presentation within a predetermined amount of time since a previous communication was received from that HMD. In some embodiments, process 600 can determine whether an amount of time that has elapsed since a last communication from each HMD. For example, HMDs can be configured to provide a status indication (e.g., a heartbeat signal) periodically (e.g., at regular and/or irregular intervals) to a server and/or user computing device acting as a host for a presentation. As another example, HMDs may communicate with a server and/or user computing device executing process 600 and/or generating a user interface for controlling a presentation by the HMD (and/or other HMDs and devices) for any suitable reason (e.g., to request content, to request presentation instructions, to log in, etc.), and process 600 can consider such a communication when determining whether an elapsed time since a most recent communication has exceeded the predetermined amount of time at 618.

If process 600 determines that a status indication has been received ("YES" at 618), process 600 can move to 620. At 620, process 600 can update a user interface used to control the presentation based on information received from the HMD. For example, as described above in connection with FIGS. 4, 5A, and/or 5B (e.g., in connection with 528 and 566), process 600 can update the user interface based on the status information.

Otherwise, if process 600 determines that a status indication has not been received within the predetermined time ("NO" at 618), process 600 can move to 622. At 622, process 600 can update a user interface used to control the presentation to indicate that a particular HMD has become disconnected (or otherwise has stopped communicating with the device executing at least a portion of process 600).

Figure 7A:
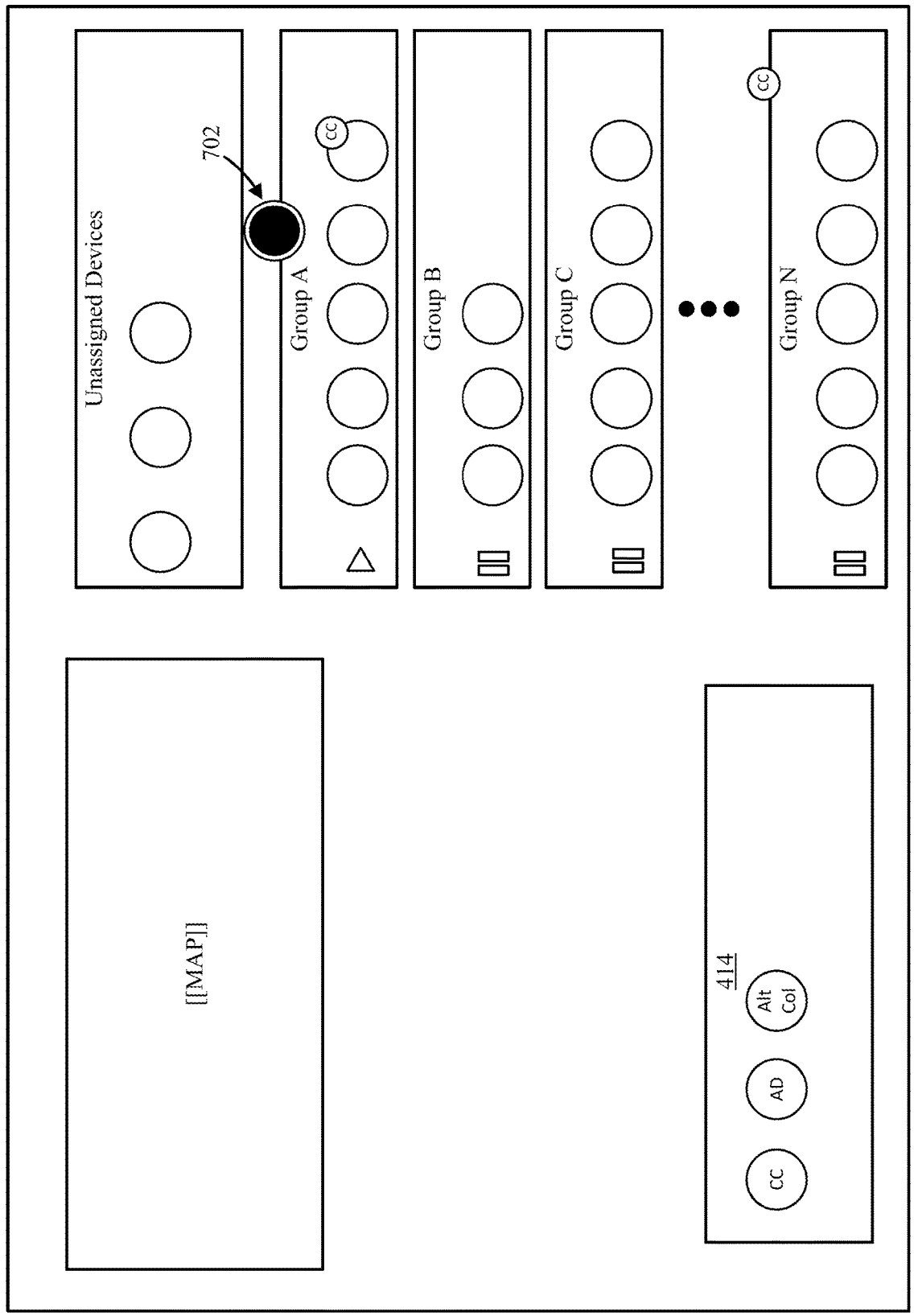
FIG. 7A shows an example of a portion of a graphical user interface being selected with an alternate input to control one or more aspects of a shared extended reality presentation in accordance with some embodiments of the disclosed subject matter.
Figure 7B:
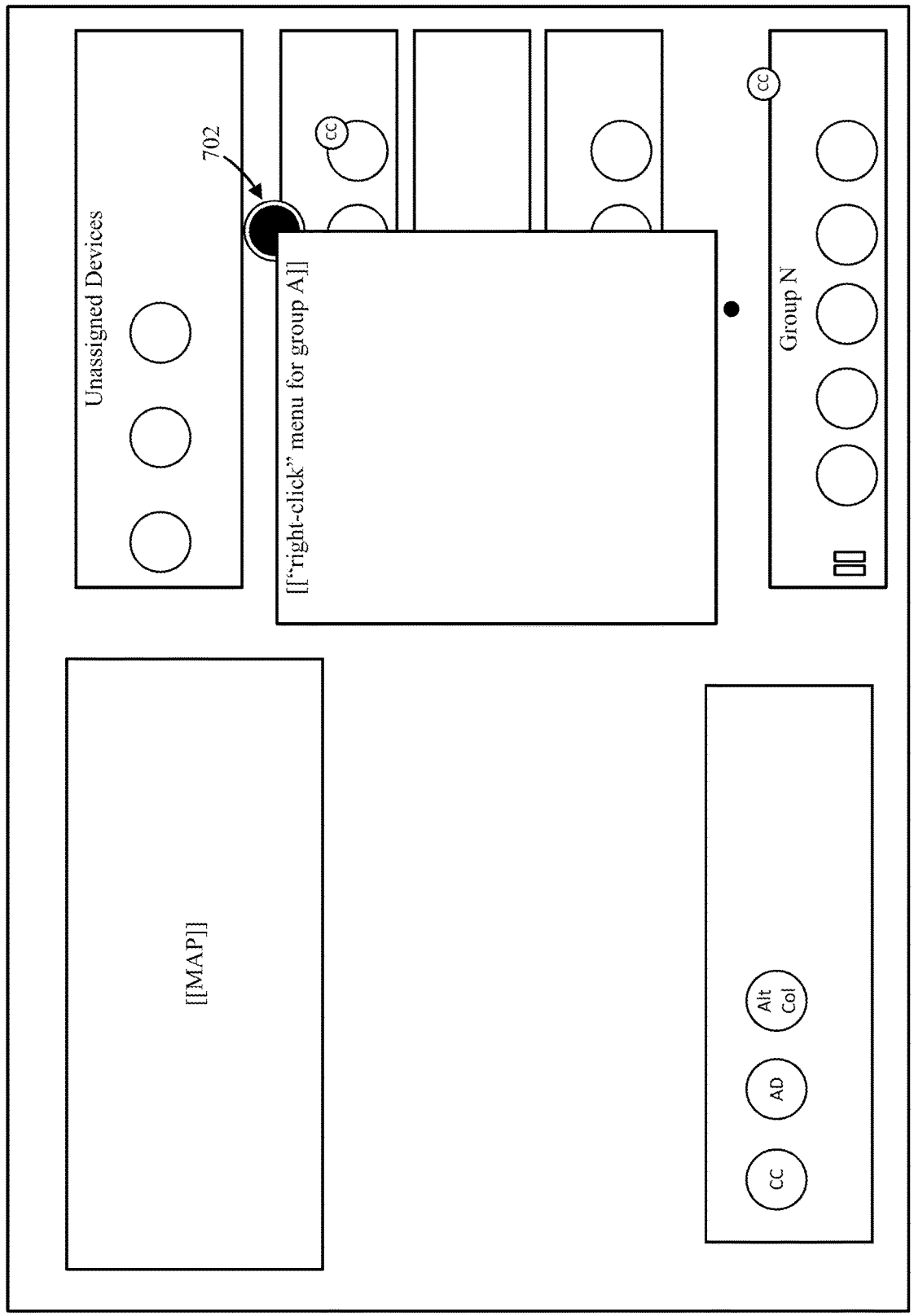
FIG. 7B shows an example of a portion of the graphical user interface of FIG. 7A including a user interface element associated with controlling one or more aspects of a group presented in response to the alternate input in accordance with some embodiments of the disclosed subject matter.

FIGS. 7A and 7B show examples of a portion of a graphical user interface being selected with an alternate input, and a user interface element associated with controlling one or more aspects of a group presented in response to the selection in accordance with some embodiments of the disclosed subject matter.

As shown in FIG. 7A, an input action 702 can be received in connection with a location on the user interface (e.g., in connection with a group portion associated with a particular group). In some embodiments, the input can be a particular type of input. For example, if the device (e.g., user computing device 220) presenting the user interface is configured to receive input via a touchscreen, the input can be a touch received at a portion of the touchscreen, and user computing device 220 can determine which user interface element is being presented at the portion of the display corresponding to the touched portion of the touchscreen. In a more particular example, the touch can be a particular touch action, such as a long press (e.g., a touch lasting at least a predetermined period of time, such as a second, two seconds, etc.), a double tap (e.g., within a threshold period of time), etc. As another example, if the device (e.g., user computing device 220) presenting the user interface is configured to receive input via a mouse (or other accessory input device), the input can be an indication that a mouse button was actuated while a cursor was in a particular location with respect to the user interface, and user computing device 220 can determine which user interface element corresponds to a location of the cursor. In a more particular example, the input can correspond to actuation of a particular mouse button (e.g., a right button) when the mouse has at least two buttons (e.g., configured to perform left-click and right-click actions).

As shown in FIG. 7B, in response to detection of input 702, a device presenting the user interface can cause a menu associated with the user interface element selected via input 702 to be presented (e.g., near a location of input 702). For example, in FIG. 7B, a menu associated with "Group A" can be presented. As another example, a menu associated with a particular device (e.g., a particular HMD) can be presented if input 702 was received at a portion of the user interface presenting a user interface element (e.g., a user interface element within a group, associated with a particular device. As still another example, a menu associated with a map user interface element can be presented if input 702 was received at a portion of the user interface presenting the map user interface element.

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as RAM, Flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any other suitable media that is fleeting and devoid of any semblance of permanence during transmission, and/or any suitable intangible media.

It will be appreciated by those skilled in the art that while the disclosed subject matter has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is hereby incorporated by reference, as if each such patent or publication were individually incorporated by reference herein.

Various features and advantages of the invention are set forth in the following claims.

The invention claimed is:

1. A system for controlling an extended reality presentation, comprising:
at least one processor that is programmed to:
receive an indication that a computing device has joined a presentation;
cause a user interface element that represents the computing device to be presented within a graphical user interface;
receive, via the graphical user interface, input indicating that the computing device is to be associated with a group of computing devices;
associate the computing device with the group of computing devices;
cause the user interface element that represents the computing device to be presented within a portion of the graphical user interface associated with the group of computing devices;
receive, via the graphical user interface, input to cause the group of computing devices to present particular extended reality content; and
transmit an instruction to each computing device in the group of computing devices to present the particular extended reality content.

2. The system of claim 1, wherein the at least one processor is further programmed to:
receive, from the computing device, a message including status information; and
update the user interface element that represents the computing device based on the status information.

3. The system of claim 2, wherein the status information includes information about a battery state of charge.

4. The system of claim 2, wherein the status information includes information about a location of the computing device.

5. The system of claim 1, wherein the computing device comprises a head mounted display.

6. The system of claim 1, wherein the at least one processor is further programmed to:
cause a user interface element that represents a presentation setting to be presented within a graphical user interface;
receive, via the graphical user interface, input indicating that the presentation setting is to be associated with at least one computing device, including the computing device;

cause a second user interface element that represents the presentation setting to be presented in proximity to the user interface element that represents the computing device; and transmit an instruction to the computing device to present the particular extended reality content based on the presentation setting.

7. The system of claim 6, wherein the presentation setting comprises a setting enabling presentation of closed captioning information.

8. The system of claim 6, wherein the input indicating that the presentation setting is to be associated with the at least one computing device comprises a drag and drop input.

9. The system of claim 1, wherein the at least one processor is further programmed to:

transmit the instruction to each computing device in the group of computing devices to present the particular extended reality content via a communication network.

10. The system of claim 9, wherein the communication network comprises a local area network.

11. The system of claim 1, wherein the at least one processor is further programmed to:

transmit the instruction to each computing device in the group of computing devices to present the particular extended reality content via a server.

12. The system of claim 1, wherein the system further comprises the server.

13. The system of claim 1, wherein the at least one processor is further programmed to:

cause a second user interface element to be presented within the graphical user interface within the portion of the graphical user interface associated with the group of computing devices, wherein the input to cause the group of computing devices to present particular extended reality content comprises a selection of the second user interface element.

14. The system of claim 13, wherein the at least one processor is further programmed to:

in response to selection of the second user interface element, cause a third user interface element to be presented in lieu of the second user interface element within the portion of the graphical user interface associated with the group of computing devices, wherein the third user interface element is a pause user interface element.

15. The system of claim 1, wherein the at least one processor is further programmed to:

cause a fourth user interface element to be presented within the graphical user interface within the portion of the graphical user interface associated with the group of computing devices;

receive, via the graphical user interface, a selection of the fourth user interface element; and in response to the selection of the fourth user interface element, transmit an instruction to each computing device in the group of computing devices to present a next portion of the particular extended reality content.

16. The system of claim 1, wherein the computing device comprises a head mounted display, and wherein the group of computing devices comprises a second computing device.

17. The system of claim 16, wherein the second computing device comprises a handheld computing device comprising a camera and a display.

18. The system of claim 1, further comprising a display used to present the graphical user interface.

19. The system of claim 1, wherein the display comprises a desktop computer monitor.

20. A method for controlling an extended reality presentation, comprising:

receiving an indication that a computing device has joined a presentation;

causing a user interface element that represents the computing device to be presented within a graphical user interface;

receiving, via the graphical user interface, input indicating that the computing device is to be associated with a group of computing devices;

associating the computing device with the group of computing devices;

causing the user interface element that represents the computing device to be presented within a portion of the graphical user interface associated with the group of computing devices;

receiving, via the graphical user interface, input to cause the group of computing devices to present particular extended reality content; and transmitting an instruction to each computing device in the group of computing devices to present the particular extended reality content.

21. A non-transitory computer readable medium containing computer executable instructions that, when executed by a processor, cause the processor to perform a method for controlling an extended reality presentation, the method comprising:

receiving an indication that a computing device has joined a presentation;

causing a user interface element that represents the computing device to be presented within a graphical user interface;

receiving, via the graphical user interface, input indicating that the computing device is to be associated with a group of computing devices;

associating the computing device with the group of computing devices;

causing the user interface element that represents the computing device to be presented within a portion of the graphical user interface associated with the group of computing devices;

receiving, via the graphical user interface, input to cause the group of computing devices to present particular extended reality content; and transmitting an instruction to each computing device in the group of computing devices to present the particular extended reality content.

* * * * *